US011924593B1

(12) United States Patent
Ben-Ezra et al.

(10) Patent No.: US 11,924,593 B1
(45) Date of Patent: Mar. 5, 2024

(54) METHOD AND SYSTEM FOR CO-PACKAGED OPTICS

(71) Applicant: NEWPHOTONICS LTD., Kfar Mordechai (IL)

(72) Inventors: Yosef Ben-Ezra, Petah Tikva (IL); Yaniv Ben-Haim, Kfar-Mordehai (IL); Igal Eliyahu, Ahituv (IL)

(73) Assignee: NEWPHOTONICS LTD, Kfar Mordechai (IL)

( * ) Notice: Subject to any disclaimer, the term of this patent is extended or adjusted under 35 U.S.C. 154(b) by 0 days.

(21) Appl. No.: 18/317,983

(22) Filed: May 16, 2023

(51) Int. Cl.
  *H04B 10/572* (2013.01)
  *H04B 10/66* (2013.01)
  *H04Q 11/00* (2006.01)

(52) U.S. Cl.
  CPC . *H04Q 11/0005* (2013.01); *H04Q 2011/0016* (2013.01); *H04Q 2011/0035* (2013.01); *H04Q 2213/054* (2013.01)

(58) Field of Classification Search
  CPC ..... H04B 10/505; H04B 10/506; H04B 10/60
  See application file for complete search history.

(56) References Cited

U.S. PATENT DOCUMENTS

| | | | | |
|---|---|---|---|---|
| 6,236,480 | B1 * | 5/2001 | Atlas | H04B 10/2537 398/9 |
| 7,756,423 | B2 * | 7/2010 | Yamashita | H04B 10/25137 398/209 |
| 10,429,601 | B1 * | 10/2019 | Seyedi | H01S 3/2391 |
| 11,115,130 | B1 | 9/2021 | Huang et al. | |
| 11,128,373 | B1 * | 9/2021 | Podmore | H04B 10/112 |
| 2018/0306976 | A1 * | 10/2018 | Mir Shafiei | G02B 6/2934 |
| 2020/0348543 | A1 | 11/2020 | Zhou et al. | |
| 2021/0359766 | A1 * | 11/2021 | Sysak | H04B 10/506 |
| 2022/0141557 | A1 | 5/2022 | Leigh et al. | |
| 2022/0303021 | A1 | 9/2022 | Nomura et al. | |
| 2023/0208542 | A1 * | 6/2023 | Krampl | H04J 3/0605 398/43 |

OTHER PUBLICATIONS

OIF, "Co-Packaging Framework Document", Feb. 2022 (Year: 2022).*

(Continued)

*Primary Examiner* — Shi K Li

(57) ABSTRACT

Described is a communication system having a transmitter comprising a first optical module, the first optical module comprising a plurality of Micro-Ring Modulators (MRMs); and a receiver comprising a second optical module, the second optical module comprising a plurality of Micro Ring Resonators (MRRs), wherein the first optical module and the second optical module are connected by an optical waveguide; and at least one comb laser external to an optical co-package comprising the transmitter or the receiver, the at least one comb laser irradiating the optical waveguide, the at least one comb laser emitting light in a plurality of wavelengths, where at least one first MRM and at least one first MRR are adjusted to operate in at least one first wavelengths from the plurality of wavelengths, and at least one second MRM and at least one second MRR are adjusted to operate in at least one second wavelength from the plurality of wavelengths.

19 Claims, 15 Drawing Sheets

(56) References Cited

OTHER PUBLICATIONS

Sun et al., "A 45 nm CMOS-SOI Monolithic Photonics Platform with Bit-Statistics-Based Resonant Microring Thermal Tuning", IEEE Journal of Solid-State Circuits, vol. 51, No. 4, Apr. 2016 (Year: 2016).*
De Aguiar et al. "Automatic Tuning of Silicon Photonics Microring Filter Array for Hitless Reconfigurable Add-Drop", Journal of Lightwave Technology, vol. 37, No. 16, Aug. 2019 (Year: 2019).*
Pleros et al., SOA-Based Multi-Wavelength Laser Sources, Fiber and Integrated Optics, vol. 23, Issue 4, 2004 (Year: 2004).*
Yu et al., A 25 Gb/s Hybrid-Integrated Silicon Photonic Source-Synchronous Receiver with Microring Wavelength Stabilization, IEEE Journal of Solid-State Circuits, vol. 51, No. 9, Sep. 2016 (Year: 2016).*
Abbas et al., "Fully Randomized 4-Channel 30 Gb/s Differential PRBS Generator with Single Clock Input and Different Channel Seed Settings", ISOCC 2020, IEEE, 2020 (Year: 2020).*
ISR and Written Opinion for PCT/IL2023/050556 (dated Oct. 12, 2023) (11 pages).

\* cited by examiner

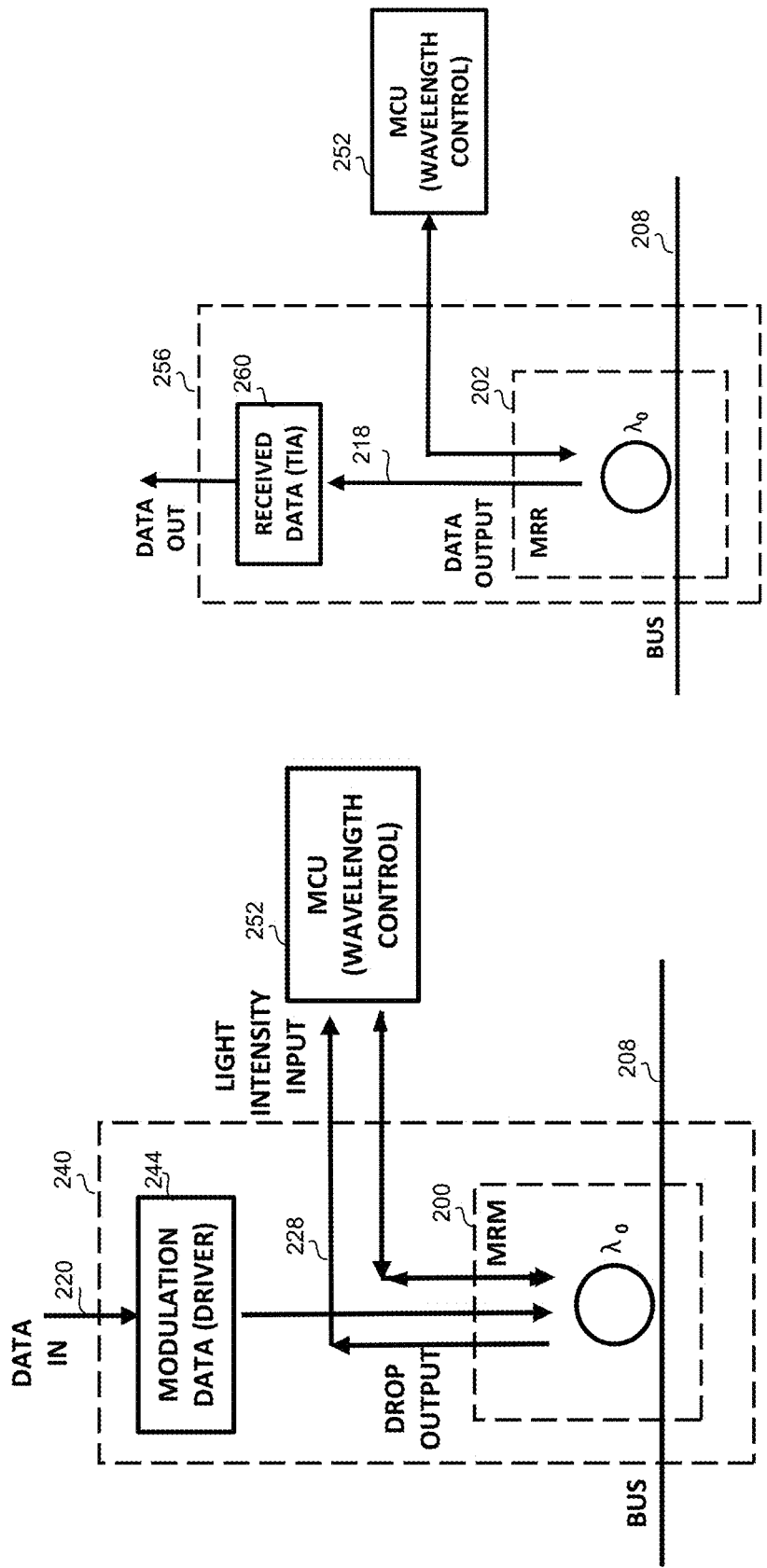

METHOD AND SYSTEM FOR CO-PACKAGED OPTICS

TECHNICAL FIELD

The present disclosure relates to photonic systems in general, and to photonic devices such as inter-co-packaged optics and/or intra-co-packaged, in particular.

BACKGROUND

Photonics is the physical science of light (photon) generation, detection, and manipulation through emission, transmission, modulation, signal processing, switching, amplification, and sensing.

Photonic systems are gaining more and more popularity in all areas, such as but not limited to light detection, telecommunications, information processing, photonic computing, lighting, metrology, spectroscopy, holography, medicine (surgery, vision correction, endoscopy, health monitoring), biophotonics, military technology, laser material processing, art diagnostics, material processing, art diagnostics involving InfraRed Reflectography Xrays, UltraViolet fluorescence, XRF), agriculture, robotics, and others.

Some important uses of photonic systems include transmitting and receiving information, multiplexing and demultiplexing information, or the like. Photonic devices may include but are not limited to photo detectors including photo diodes or photo transistors, laser diodes, optical modulators, passive optical components, light-emitting diodes, solar and photovoltaic cells, displays and optical amplifiers. Other examples include devices for modulating a beam of light and for combining and separating beams of light of different wavelength.

The need for photonic devices arises from the limits and limitations of electronic devices. A first limit relates to the transfer rate of information, and is due to electron speed saturation. A second limitation arises from the high power consumption of electronic devices, and thus the generated heat, and the footprint and cost of heat dissipation. The use of photonic devices provides for higher rates, with little heating, thus curing or easing these problems.

Co-packaged optics are based on integration of optical communications, optical signals and data processing capabilities, with switch chips, chip-to-chip communication or other silicon CMOS analog and digital devices.

An optical switch is a multi-port network bridge, which connects multiple waveguides such as optic fibers to each other and controls data packets routing between inputs and outputs. Optical switches generally switch or modulate optical signals in accordance with electric input signals.

An optical switch may be implemented as co-packaged optics, comprising within the same package Electronic Integrated Circuits (EIC) and Photonic Integrated Circuits (PIC). Optical fibers and communication may be used inter-switch for connecting between switches, or intra-switch for connecting elements within the switch.

BRIEF SUMMARY

One exemplary embodiment of the disclosed subject matter is a communication system comprising: a transmitter comprising a first optical module, the first optical module comprising a plurality of Micro-Ring Modulators (MRMs); a receiver comprising a second optical module, the second optical module comprising a plurality of Micro Ring Resonators (MRRs), wherein the first optical module and the second optical module are connected by an optical waveguide; and one or more comb lasers external to an optical co-package comprising the transmitter or the receiver, the comb lasers irradiating the optical waveguide, the comb lasers emitting light in a plurality of wavelengths, wherein a first MRM and a first MRR are adjusted to operate in one or more first wavelengths from the plurality of wavelengths, and one or more second MRMs and one or more second MRRs are adjusted to operate in a second wavelength from the plurality of wavelengths. Within the communication system, the first MRM and first MRR are optionally adjusted to operate using a training sequence. Within the communication system, the first MRM and first MRR are optionally adjusted so to operate using pilot signals. Within the communication system, the transmitter and the receiver are optionally comprised within one optical co-package. Within the communication system, the transmitter is optionally within a first optical co-package and the receiver is optionally within a second optical co-package. Within the communication system, downlink channels of the transmitter and receiver optionally operate in a first plurality of wavelengths from the plurality of wavelengths, and uplink channels of the transmitter and receiver optionally operate in a second plurality of wavelengths from the plurality of wavelengths, wherein the first plurality of wavelengths and the second plurality of wavelengths have no common wavelength. Within the communication system, each wavelength in the first plurality of wavelengths optionally comprises frequencies is higher than at least one frequency of the second plurality of wavelengths. Within the communication system, downlink channels of the transmitter and receiver optionally operate in the plurality of wavelengths polarized to a first polarization, and uplink channels of the transmitter and receiver optionally operate in the plurality of wavelengths polarized to a second polarization, wherein the first polarization is different from the second polarization. The communication system can further comprise a power splitter splitting power of the optical waveguide to a first part and a second part, wherein transmitting operates with the first part and receiving operates with the second part. Within the communication system, the transmitter optionally comprises a first optical waveguide micro controller unit (MCU) for controlling the plurality of MRMs, and the receiver optionally comprises a second MCU for controlling the plurality of MRRs. Within the communication system, the first MCU and the second MCU are optionally adjusted using a handshake protocol. The communication system can further comprise a Broadband Optical Amplifier and a non-invasive power measure for ensuring equal power for each wavelength. Within the communication system, the comb lasers optionally comprise two or more comb lasers for providing redundancy, thereby reducing failure rate of the at least one comb laser. Within the communication system, the MCU is optionally configured to: swing an MRM ring temperature of each MRM from the plurality of MRMs until maximum light is detected in a drop output; and change modulation of the MRM until a minimum is detected in non-invasive detector at an end of a line of the MRM. Within the communication system, the MCU is optionally further configured to: for each MRR from the plurality of MRRs: send a training sequence or pilot signals from an MRM corresponding to the MRR; and swing an MRR ring temperature or the bias voltage of the MRR until the training sequence or the pilot signals are detected with a required quality in the channel. Within the communication system, the MCU is optionally further configured to repeat said: swing the MRM ring temperature or the bias voltage; changing modulation of the MRM; sending a training sequence or pilot signals; and swing an MRR ring temperature in accordance with a quality parameter. Within the communication system, the quality parameter optionally comprises one or more parameters selected from the group consisting of: channel performance, accumulated errors, Bit Error Rate (BER); Packet Error Rate; and Received Signal Strength Indicator (RSSI). Within the communication system, an MRM of the plurality MRMs is optionally a segmented MRM (SMRM).

Another exemplary embodiment of the disclosed subject matter is a method for adjusting the plurality of MRMs in a transmitter comprising: a first optical module, the first optical module comprising a plurality of Micro-Ring Modulators (MRMs), a receiver comprising a second optical module, the second optical module comprising a plurality of Ring Resonator Modules (MRRs), wherein the first optical module and the second optical module are connected by an optical waveguide, and at least one comb laser external to an optical co-package comprising the transmitter or the receiver, the at least one comb laser irradiating the optical waveguide, the at least one comb laser emitting light in a plurality of wavelengths, wherein at least one first MRM and at least one first MRR are adjusted to operate in at least one first wavelengths from the plurality of wavelengths, and at least one second MRM and at least one second MRR are adjusted to operate in at least one second wavelength from the plurality of wavelengths, a method for adjusting the plurality of MRMs, the method comprising: for each MRM from the plurality of MRMs: swinging an MRM ring temperature or the bias voltage of the MRM from the plurality of MRMs until maximum light is detected in a drop output; and changing modulation of the MRM until a minimum is detected in non-invasive detector at an end of a line of the MRM. The method can further comprise: for each MRR from the plurality of MRRs: sending a training sequence or pilot signals from an MRM corresponding to the MRR; swinging an MRR ring temperature or the bias voltage of the MRR until the training sequence or the pilot signals are detected with a required quality in a channel.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 2D shows schematic illustration of the data and control interfaces of an MRM, in accordance with some exemplary embodiments of the disclosure:

FIG. 2E shows schematic illustration of the data and control interfaces of an MRR, in accordance with some exemplary embodiments of the disclosure:

DETAILED DESCRIPTION

Figure 1:
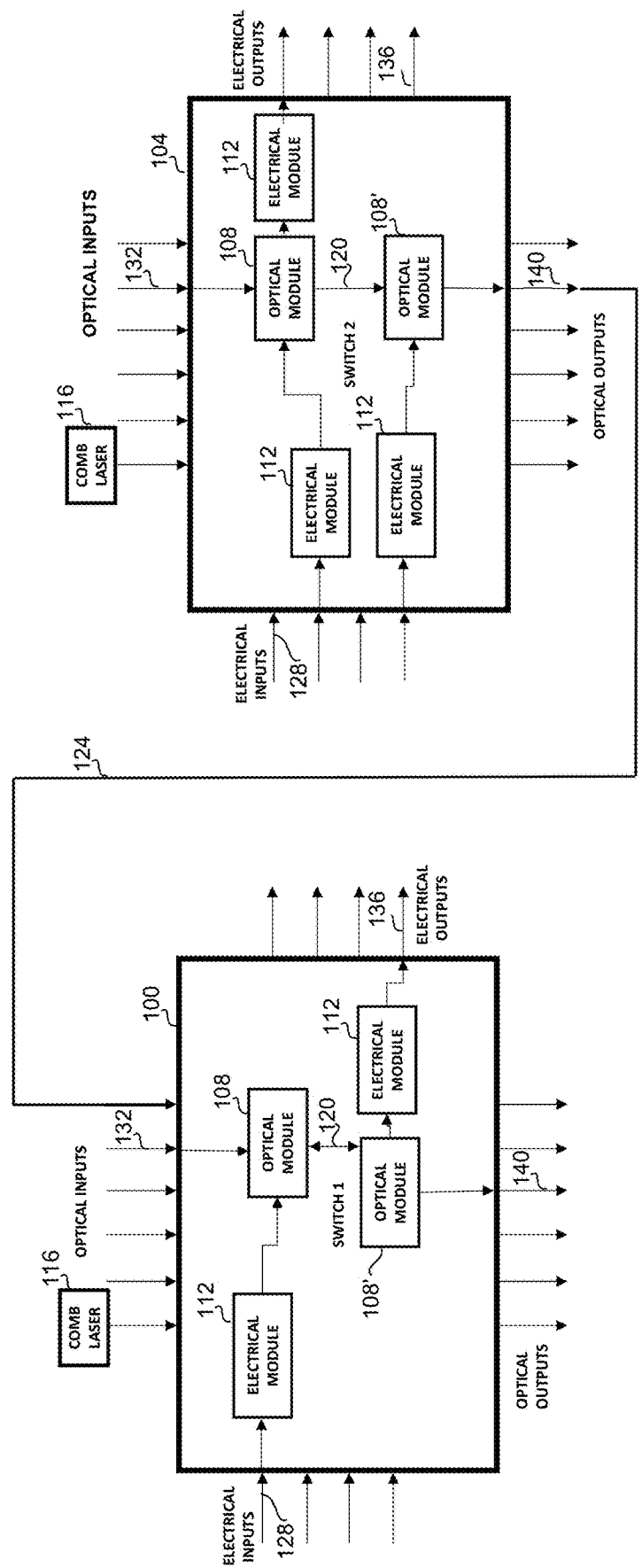
FIG. 1 is a schematic illustration demonstrating inter-switch and intra-switch communication, in accordance with some exemplary embodiments of the disclosure.

A switch, for example in a data center, is a multi-port network bridge. Each such port, in order to communicate with external electronic circuit, requires a transceiver. Some transceivers are pluggable. The higher the transfer rate required from a switch, the more transceivers are needed. However, the analog lines that connect to the transceivers take significant space of the silicon area of the switch, and produce significant heat. Therefore, the current trend is to integrate silicon transceivers into the switch itself, in order to connect between the waveguides, such as optic fibers and the electronic components.

Optical switches require a light source to produce light, such that the light is modulated to reflect the input electric signals. The light source is usually a laser source integrated within the optical switch.

One technical problem handled by the disclosure is that a laser source is a less reliable component in the context of co-packaged optics. For example, in a switch, large number of lasers are used which are both expensive and have a failure rate which is significantly higher than the failure rate of other components of the switch. A failure of the laser source makes the switch unusable, thus, having a laser as integrated part of the switch increases the downtime and maintenance cost of the unit. Moreover, if a switch comprises multiple laser sources, the switch's failure rate, down time and fixing costs increase further. Thus, having a switch that comprises one or more laser sources is a significant hurdle and bottleneck to implementing a reliable optical co-package that provides high transfer rate.

One technical solution of the disclosure is the separation of the light source from the co-packaged system, i.e., making the light source external to the switch. This separation provides for removing the less reliable component from the co-packaged system, e.g., the switch, thereby decreasing the failure rate of the switch, and reducing downtime and maintenance costs of the system as a whole.

In some embodiments, the light source may be a comb-laser, which emits a plurality of wavelengths. The wavelengths may be equidistant. For example, a comb laser may output 8-64 wavelengths, depending on the number of required ports and the number of the intra communication channels.

The plurality of wavelengths may be used in some manners. For example, some wavelengths may be used for downlink channels while others are used for uplink channels. In other embodiments, different polarizations of the light may be used, and in further embodiments, power splitting may be used.

Using a comb laser source rather than a plurality of separate laser sources such as a laser array, provides for higher accuracy. The comb laser provides light emission characterized by equally spaced narrow optical lines, having substantially the same intensity, relatively low phase noise and low mode partition noise, and corresponding behavior of the light in all wavelengths. For example, if there is a shift in the laser spectrum due to temperature or other environmental parameters, all wavelengths are shifted in the same direction. Additional advantages include the lower footprint of the comb laser, and that the light in the different wavelengths does not need to be merged since it comes out of a single source.

The comb-laser may be used in conjunction with a plurality of Micro-Ring Modulators (MRMs) for transmitting, and a corresponding plurality of Micro Ring Resonators (MRRs) for receiving, as detailed below, thus enabling bi-directional communication at high transfer rates with low footprint.

Additionally or alternatively, the comb-laser may be used in conjunction with a plurality of MRMs or Segmented MRMs for the simultaneous conversion of modulation format and transmission of the signals.

Another technical solution of the disclosure relates to adjusting the wavelengths of each MRM with the corresponding MRR, such that the transmitter and receiver indeed operate at the one of the wavelengths of the comb laser, to provide the required output. The MRMs and MRRs may be adjusted by tuning their working temperatures in accordance with the respective wavelength using predetermined training sequences, pilot signals, or the like.

Components within and external to the devices may be controlled by a micro controller unit (MCU), responsible for example to: adjusting heater control for components such as MRMs so they can lock on a specific wavelength, by observing the Drop output of the MRM; adjusting heater control for MRRs to lock on a specific wavelength, by checking output of a photodiode receiving the output of the MRR; sending training sequence and/or pilot sequences signals to be modulated on the MRMs when used as transmitters, detecting and recovering the training sequence or pilot sequences in the MRR when used as receivers, and changing the training sequence and/or pilot sequences signals if not received correctly; or the like.

An MCU may be external or internal to a co-package optics. In case it is internal to the package and integrated within the silicon, the MCU may be connected to the Photonic Integrated Circuit (PIC) by means of: Wire Bond; Flip Chip; Interposer or the like. The MCU may also be implemented on the same die as the optical components of the PIC.

One technical effect of the disclosure relates to providing an optical co-package, which is durable and thus has low downtime and offers high usability, since the less reliable component is made external thereto.

Another technical effect of the disclosure relates to providing high transfer rate of the unit, enabled by using a comb laser emitting a plurality of wavelengths as the external laser source.

Although the disclosure below, and in particular FIG. 1 and FIGS. 3-8 focus on switches, it will be appreciated that it is not limited to switches. Rather, the disclosure is applicable to any optical co-package requiring connectivity between a network and devices external to the network, including but not limited to switches, chip-to-chip communication, or the like. The optical co-packages may be implemented as any integrated photonics device, such as but not limited to silicon, silicon nitride, silicon-on-insulator, or the like. Optical waveguides within the devices may be implemented as optic fibers, silicon, silicon oxide waveguides, or the like.

It will be appreciated that the disclosure relates to communication within an optical co-package, between different co-packages. For example, the disclosure is applicable to inter-switch as well as intra-switch implementations.

Referring now to FIG. 1, showing a schematic illustration demonstrating inter-switch and intra-switch communication, in accordance with some exemplary embodiments of the disclosure.

Each of switch 1 (100) and switch 2 (104) may be an optical switch and may thus comprise one or more optical modules 108, 108' and one or more electrical modules 112. It will be appreciated that electrical modules 112 may be identical or different, and similarly for optical modules 108, 108'. Each of switches 100, 104 may receive electrical inputs 128 and optical inputs 132. The optical input may be received over optical waveguides 132 receiving light from a source external to switch 1 (100) and to switch 2 (104), such as one or more comb lasers 116.

Any of switch 1 (100) or switch 2 (104) may be implemented as an integrated photonics device, such as but not limited to silicon, silicon nitride, silicon-on-insulator, or the like. The waveguides within a device and between devices may be implemented as optic fibers, silicon, silicon oxide waveguides, or the like.

Comb laser 116 may be implemented, for example as a comb laser for O-Band (1270-1360 nm) or C-band (1530-1565 nm) or any other optical band defined by a standard which may output, for example 8-32 wavelengths. Optionally, the used wavelengths may be equidistant within the ranges.

The disclosure, including external comb laser 116, may be applicable to intra-switch communication, i.e., communication within a switch, for example communication 120 between optical module 108 and optical module 108'. However, the disclosure is also applicable to inter-switch communication, i.e., communication between switches, such as communication 124 between switch 2 (104) and switch 1 (100). It will be appreciated that although communication 124 appears unidirectional, it can be also be bi-directional.

Figure 2B:
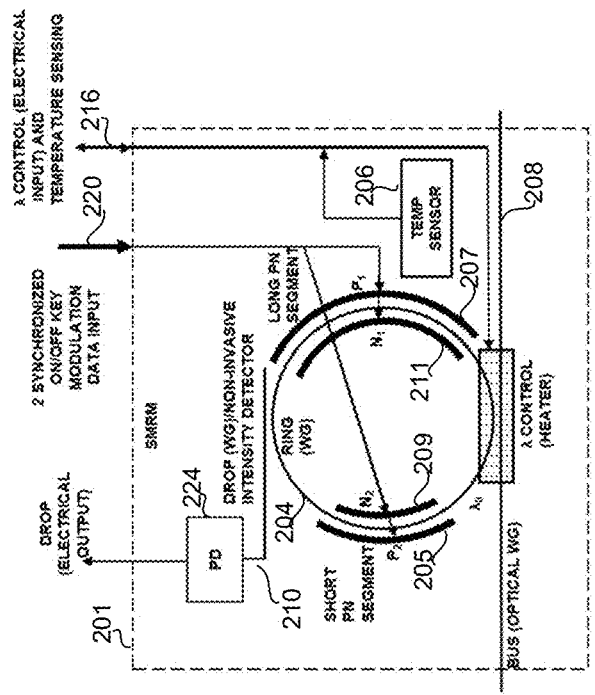
FIG. 2B show a schematic illustration of a segmented Micro-Ring Modulator (SMRM), in accordance with some exemplary embodiments of the disclosure.
Figure 2A:
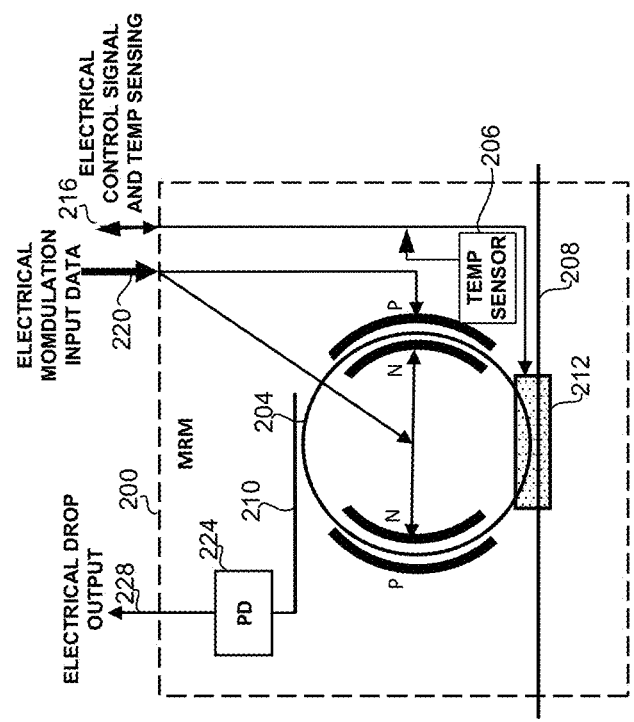
FIG. 2A shows a schematic illustrations of a Micro-Ring Modulator (MRM), in accordance with some exemplary embodiments of the disclosure.

Referring now to FIG. 2A showing a schematic illustrations of a Micro-Ring Modulator (MRM), in accordance with some exemplary embodiments of the disclosure.

MRM 200 shown in FIG. 2A comprises a ring 204, bus 208 and drop waveguide 210. Ring waveguide 204 is doped to form e.g. lateral PN junction. When the PN junction is reverse biased, a local change is caused in the refraction index of optical ring 204, and thereby in the phase of the light going through waveguide 208, 210. The change of phase, in turn, causes constructive or destructive interference in bus waveguide 208. It is appreciated that ring 204 only affects wavelengths for which its perimeter divided by the wavelength is an integer number, $$\text{i.e., } = \frac{2 * \pi * r}{\lambda} = N.$$

Thus, in order for the ring to resonate a certain wavelength, its perimeter needs to be adjusted to correspond to the wavelength. The adjustment may be performed by heater 212, controlled by electrical control signal 216. The temperature of ring 204 or an element in the vicinity thereof may be measured by temperature sensor 206, which feeds back the sensed temperature to the MCU as detailed below. Once ring 204 is in the right temperature and is thus tuned for the required wavelength, it passes the relevant wavelength and may modulate the light in accordance with electrical modulation input data 220. The output light which is in the resonance wavelength of the ring enters drop waveguide 210 which thus transmits only the relevant wavelength, and photo diode 224 which converts the light into the output electrical signal 228.

Thus, MRM 200 receives an electrical data signal 220, electrical control signals 216 and outputs temperature sensing (also indicated 216) and electrical output which after passing Photo Detector (PD) 224 is electrical control output 228.

Referring now to FIG. 2B, showing a schematic illustration of a segmented MRM (SMRM), in accordance with some exemplary embodiments of the disclosure.

The optical components of the SMRM, i.e., optical waveguide 208 and ring 204 are similar to the MRM. However, the PN junction around the ring is split into two segments, such that one segment is larger than the other, by some ratio. Thus, the P is split into $P_1$ 207 and $P_2$ 205, and the N is split into $N_1$ 211 and $N_2$ 209, wherein $P_1$ 207 and $N_1$ 211 are larger than $P_2$ 205 and $N_2$ 209. When no bias voltage is applied to the PN junction segments, a logic '0' is applied to both modulation inputs, no phase shifting occurs in the ring, this is the first symbol state of 00. When bias voltage is applied to the short segment but not to the long segment, a small phase shift occurs in the ring, which produce the second symbol state of 01. When voltage is applied to the long segment but not to the short segment a larger phase shift occurs in the ring which implies a symbol state of 10, and when voltage is applied to both segments, a maximum phase shift occurs in the ring which is the fourth symbol state of 11.

These four levels generate four level pulse-amplitude modulation (PAM4) modulation in the ring, using two synchronized On Off Keying (OOK) bit inputs. Each of the inputs requires a driver to drive the related PN segment. This functionality may replace the need for digital signal processing for the modulation format conversion, which is a highly power consuming and may induce latency on the optical modulation format conversion based on the SMRMs.

It will be appreciated that in the disclosure below, wherever an MRM is mentioned, the disclosure may equally apply to SMRM.

Figure 2C:
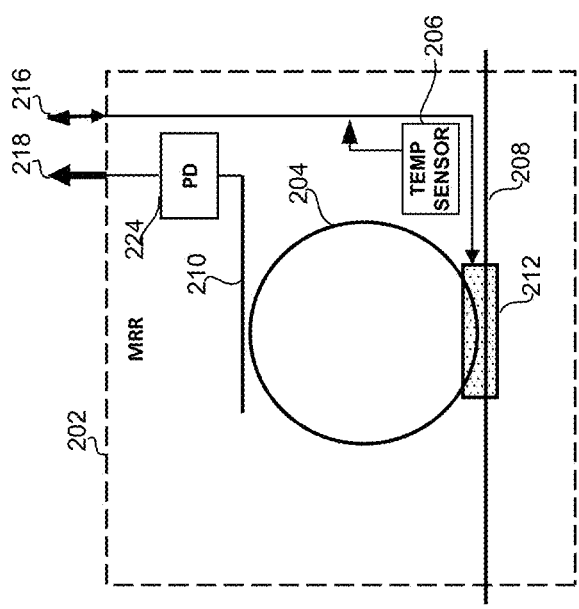
FIG. 2C shows a schematic of a Micro Ring Resonator (MRR), in accordance with some exemplary embodiments of the disclosure.

Referring now to FIG. 2C showing a schematic illustration of a Micro Ring Resonator (MRR), in accordance with some exemplary embodiments of the disclosure.

MRR 202 comprises, in a similar manner to MRM 200, ring 204, heater 212, optical waveguide 208, waveguide 210 and photo diode 224. Ring 204 outputs the relevant wavelengths over drop waveguide 210 which outputs the required wavelength, and photo diode 224 converts it into an electrical signal.

Thus MRR 202 receives the modulated optical signal through optical bus 208, an input electrical control signal 216, and outputs temperature sensing (also indicated 216) and detected electrical output 218.

Referring now to FIG. 2D, showing an Electrical-to-Optical converter comprising an MRM and its data and control interfaces, in accordance with some exemplary embodiments of the disclosure.

Electrical-to-Optical converter 240 may comprise MRM 200, and electrical driver 244. An input electrical signal 220 is provided to electrical driver 244. When the modulator receives electrical signal, the amplitude may not be enough for modulating the light, therefore the driver adjusts the voltage to the required value for activating the modulator. The signal is applied to MRM 200 which converts the electrical data to the optical domain.

MRM 200 may also receive control input from MCU 252, and output to MCU 252 the drop output 228 and sensed temperature. The communication with MCU 252 may be for adjusting MRM 200 to the wavelength it is supposed to work with.

Referring now to FIG. 2E, showing the data and control interfaces of MRR 202 in accordance with some exemplary embodiments of the disclosure.

Optical-to-Electrical converter 256 may comprise MRR 202, may resonate the light coming over bus 208, and may provide electrical output data 218 to Trans-Impedance Amplifier (TIA) 260 which amplifies the data.

MRR 202 may also receive control input from MCU 252, and output to MCU 252 the sensed temperature, as part of adjusting MRR 202 to the correct wavelength it is supposed to work with.

Figure 2F:
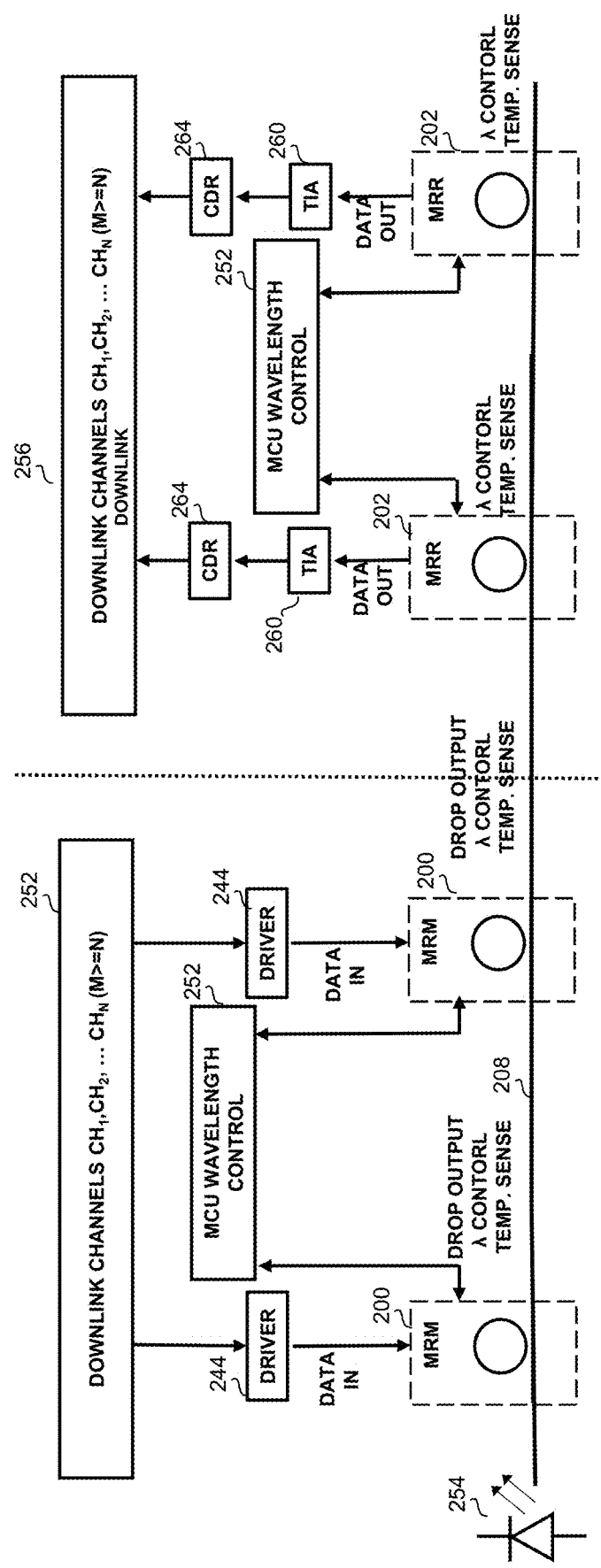
FIG. 2F is a schematic illustration of end-to-end downlink communication in a transmitter and receiver system, in accordance with some exemplary embodiments of the disclosure.

Referring now to FIG. 2F, showing a schematic illustration of end-to-end downlink communication in a transmitter and receiver system comprising one or more optical co-packaged systems, e.g., switches, in accordance with some exemplary embodiments of the disclosure.

The system receives input data from a data source over N downlink channels 252, and outputs the data to the destination over N channels 256.

The data received in every channel is fed into a corresponding high-output driver amplifier 244, in order to provide a high-voltage electrical signal required for driving the optical modulator. The amplified signal is provided MRM 200 operating at a predetermined wavelength. The driver can also be integrated within the silicon, or separated therefrom.

MRMs 200 receive light in M wavelengths from comb laser 254 along waveguide 208 and are modulated by no more than M MRMs 200, each operating at one of the wavelengths of comb laser 254. In order to fully utilize the capabilities of the co-packaged systems, e.g., switches, and support all required channels, the number of wavelengths emitted by comb laser 254, denoted M, should be greater or equal to N. In some embodiments, M may be equal to N.

The modulated light goes over bus 208 to at least N number of MRRs 202, each resonating the light received from the corresponding MRM 200 in the corresponding wavelength, and then to a corresponding TIA 260 and clock data recovery (CDR) 264, and output through the N downlink channels 256.

Each MRM 200 and each MRR 202 is controlled by one or more MCUs 252, ensuring they both operate at the correct temperature and bias voltage and thus the correct wavelength. MCU 252 may send control signals, and receive the sensed temperature. MCU 252 may also receive from MRM 200 the drop output.

It will be appreciated that although the system above is described in association with downlink channels, an analogous system can be operative for the uplink channels.

Figure 3:
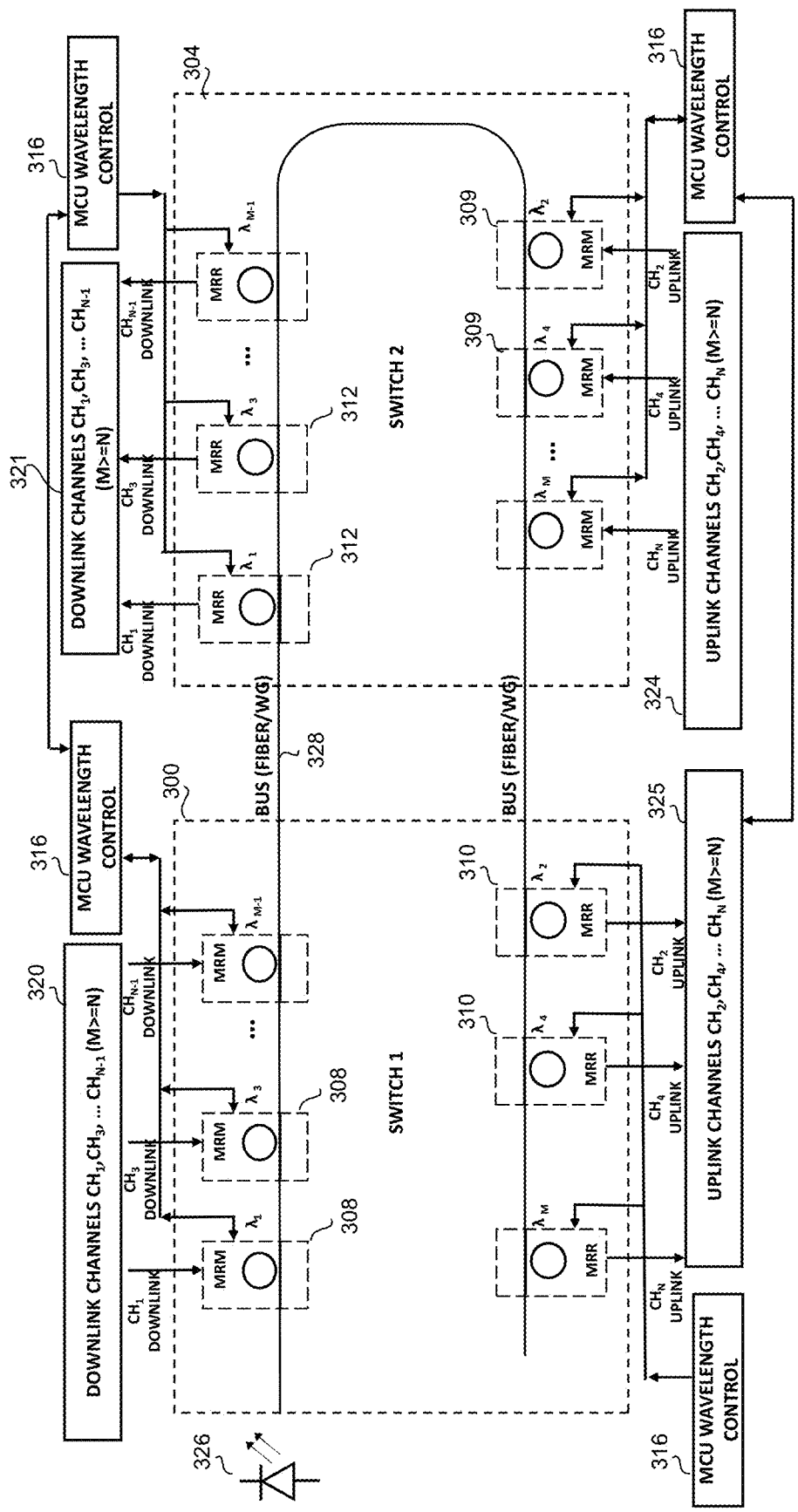
FIG. 3 shows a schematic diagram of a first embodiment of inter-switch optical communication, in accordance with some exemplary embodiments of the disclosure.

Referring now to FIG. 3, showing a schematic diagram of an embodiment of inter-switch optical communication, in accordance with some exemplary embodiments of the disclosure. In this embodiment, the downlink channels of the transmitter and receiver operate in a first plurality of wavelengths, and the uplink channels of the transmitter and receiver operate in a second plurality of wavelengths, wherein the first plurality of wavelengths and the second plurality of wavelengths have no common wavelength. For example, the first plurality of wavelengths may comprise wavelengths with odd indices $\lambda_1, \lambda_3, \ldots \lambda_N$ (assuming that N is even) and the second plurality of wavelengths may comprise wavelengths with even indexes $\lambda_2, \lambda_4, \ldots \lambda_N$ (k. This interleaving scheme may increase the spacing between the neighbor channels and reduce the crosstalk between them.

FIG. 3 shows co-packaged optic system 300 (e.g. a switch 1) and co-packaged optic system 304 (e.g., switch 2), which may be, for example, part of a data center. The term "downlink" relates to receiving data which is transmitted from system 300 to system 304. The term "uplink" relates to transmitted data from system 304 to system 300. Since the communication is bidirectional these terms can be used interchangeably for both co-packaged optical systems 300 and 304.

Thus, for downlinks, co-packaged optic system 300 (e.g., switch 1) is the transmitter and co-packaged optic system 304 (e.g., switch 2) is the receiver, and vice versa for uplink. The two switches are connected by an optical waveguide 328 serving as a bus, for example a fiber optic.

Switch 1 (300) comprises a plurality of MRMs 308 and MRRs 310. Each MRM 308 is connected to a downlink channel from downlink channels 320 and each MRR 310 is connected to an uplink channel from uplink channels 325. Switch 2 (304) comprises a plurality of MRMs 309 and MRRs 312. Each MRR 312 is connected to a downlink channel from downlink channels 321 and each MRM 309 is connected to an uplink channel from uplink channels 324.

Each of co-packaged optic system 300 (e.g. switch 1) and co-packaged optic system 304 (e.g., switch 2) may support a total of N channels. N being equal to the number of wavelengths radiated by comb laser 326, and also to the number of MRMs and the number of MRRs within the co-packaged optic system (e.g. switch). In some embodiments, N may be an even number, and the number of MRMs as well as the number of MRRs is N/2. For simplicity, it is assumed that the downlink channels are the odd ones, such as 1, 3 . . . N−1, and the uplink channels are the even ones, such as 2, 4 . . . N.

The system comprises one or more comb lasers 326, irradiating light to waveguide 328 over M wavelengths, wherein M is equal to or larger than N. For simplicity, it is assumed that N=M.

For downlink communication, the data from each of downlink channels 320 is applied to MRMs 308 of co-packaged optic system 300 (switch 1), operating at one of the odd wavelengths irradiated by comb laser 326, such as $\lambda_1, \lambda_3 \ldots \lambda_{N-1}$. The light is modulated in accordance with the wavelength of the MRM handling each channel. The light is propagated over bus 328 to switch 2 (304), where it is received and resonated by MRRs 312 of co-packaged optic system 304 (switch 2), each operating at the wavelength corresponding to the MRM 308 wavelength, and output to the one of downlink output channels 321.

Similarly, upon receipt of uplink communication, the data from each of uplink channels 324 is received by one of MRMs 309 of co-packaged optic system 304 (e.g., switch 2), operating at one of the even wavelengths irradiated by comb laser 326, such as $\lambda_2, \lambda_4 \ldots \lambda_N$. The light is modulated in accordance with the operation wavelength of the MRM handling each channel. The light is propagated over bus 328 to co-packaged optic system 300 (switch 1), where it is received and resonated by MRRs 310 of co-packaged optic system 300 (e.g. switch 1), each operating at the wavelength corresponding to the MRM 309 wavelength, and output to the one of uplink output channels 325.

Thus, in this embodiment, a part such as half of the channels and wavelengths are used for downlink, while the other part of the channels and wavelengths are used for uplink.

All down link channels 320, 321 and uplink channels 324, 325 may be connected to one or more micro controller units (MCUs) 316. MCUs 316 may adjust the heater control for changing the dimensions of the MRM, such that the MRM locks on a required wavelength. MCU 316 may also control the MRM bias voltage and modulation depth for the optimization of the communication channel performance by means of the extinction ratio, bit error rate (BER), packet error rate (PER), etc. In order to lock on the wavelength, MCU 316 may observe the drop output of MRM 308,309. MCU 316 may further adjust the heater control for MRR 310, 312 to lock on a wavelength by checking the output of the photo diode associated with MRR 310, 312. MCU 316 is also useful in transmitting a training sequence and/or pilot signals to be modulated by MRM 308, 309 as part of the transmitter, and to detect and recover the training sequence or pilot signals in MRR 310, 312 as part of the receiver.

If there are multiple MCUs 316, a handshake mechanism may exist to ensure they are all tuned to adjust the MRMs and MRUs in a corresponding manner.

MCUs 316 may be external or internal to any of the co-package optics. In the internal case, MCU 316 can be connected to the photonic integrated circuit (PIC) by any connecting medium, such as but not limited to wire bond, flip chip, interposer, implemented on the same die as the optical components of the PIC, or the like. It will be appreciated that if two or more substrates are used, at least two MCUs 316 may be used.

Figure 4:
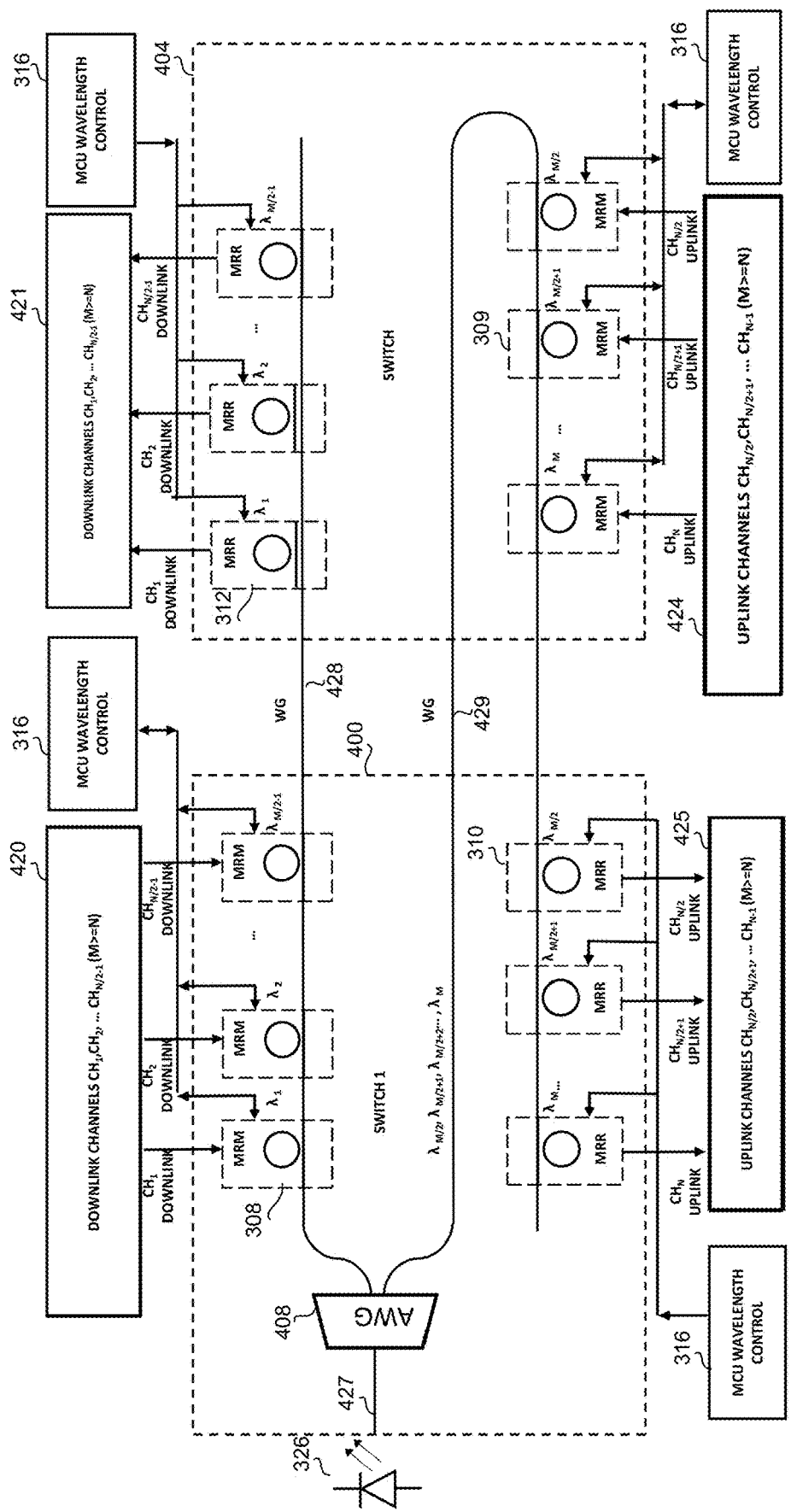
FIG. 4 shows a schematic diagram of another embodiment of inter-switch optical communication, in accordance with some exemplary embodiments of the disclosure.

Referring now to FIG. 4, showing a schematic diagram of another embodiment of inter-switch optical communication, in accordance with some exemplary embodiments of the disclosure.

FIG. 4 shows co-packaged optic system 400 (switch 1) and co-packaged optic system 404 (switch 2), which may be, for example, part of a data center. The terms "uplink" and "downlink" are as described in association with FIG. 3 above.

Thus, for downlinks, system 400 is the receiver and system 404 is the transmitter, and vice versa for uplink. The two co-packaged optic systems (switches) may be connected by optical waveguides 428, 429 serving as busses, for example so integrated optical waveguides or fiber optics.

system 400 may comprise a plurality of MRMs 308 and MRRs 310. Each MRM 308 is responsible for the transmission of the data related to the certain single channel from the multiplicity of the downlink channels 420 and each MRR 310 is responsible for the receiving the data related to the specific single channel from uplink channels 425, co-packaged optic system 404 (Switch 2) may comprise a plurality of MRMs 309 and MRRs 312. Each MRR 312 is responsible for the receiving of the data related to the certain single channel from downlink channels 421 and each MRM 309 is responsible for transmitting the data related to the specific single channel from uplink channels 424.

Each of co-packaged optic system 400 (switch 1) and co-packaged optic system 404 (switch 2) supports a total of N downlink and uplink channels (together) which is equal to the number of wavelengths radiated by the comb laser. The number of MRMs and MRRs within the co-packaged optic system (e.g. switch) is determined by the number of channels that needs to be supported. For example N/2 MRMs and N/2 MRRs can be used at each of the co-packages systems in case of the equal amount of information assigned for the uplinks and downlinks. In some embodiments, asymmetric allocation of uplinks and downlinks can be considered.

The system comprises one or more comb lasers 326, irradiating light to waveguide 427 over M wavelengths, wherein M is equal to or larger than N. For simplicity, it is assumed that N=M.

Array Waveguide Grating (AWG) 408 may split the wavelengths received from comb laser 326, and transmit half (or another part) of the wavelengths, such as wavelength $$\lambda_1, \lambda_2 \ldots \lambda_{\frac{M}{2}}$$

(for even M) to first waveguide 428, and the other half (or the complementary part), such as . . .

$$\frac{\lambda_M}{2}+1, \frac{\lambda_M}{2}+2 \ldots \lambda_M$$

to second waveguide 429. For example, AWG 408 may split the wavelengths using a high band-pass filter and a low band-pass filter. First waveguide 428 carries the light as modulated in accordance with the downlink data from co-packaged optic system 400 (switch 1) to co-packaged optic system 404 (switch 2), while second waveguide 429 carries the light as modulated in accordance with the uplink data from co-packaged optic system 404 (switch 2) to co-packaged optic system 400 (switch 1). It is appreciated that in this architecture, splitting the wavelengths assigned to downlink and uplink reduces the number of a MRMs on the same bus, hence reducing optical losses and reducing cross talk between channels.

For downlink communication the data from downlink channels 420 is applied to the MRMs 308 of co-packaged optic system 400 (switch 1), operating at one of the wavelengths irradiated by comb laser 326 and directed by AWG 408 to bus 428, such as $$\lambda_1, \lambda_2 \ldots \lambda_{\frac{M}{2}}.$$

The light is modulated in accordance with data from the corresponding downlink channel. The light is propagated over bus 428 to system 404 (switch 2), where it is received and detected by MRRs 312 which filters only the wavelength it is resonant with of co-packaged optic system 404 (switch 2), each operating at the wavelength corresponding to the light wavelength, and output to the one of downlink output channels 421.

Similarly, for uplink communication, the data from each of uplink channels 424 is applied to one of MRMs 309 of co-packaged optic system 404 (switch 2), operating at one of the wavelengths irradiated by comb laser 326 and directed by AWG 408 to bus 429, such as $$\frac{\lambda_M}{2}+1, \frac{\lambda_M}{2}+2 \ldots \lambda_M.$$

The light in the respective wavelength may be modulated in accordance with the data received from a corresponding uplink channel 424. The light is propagated over bus 429 to co-packaged optic system 400 (switch 1), where it is received and detected by MRRs 310 of co-packaged optic system 400 (switch 1), each operating at the wavelength corresponding to the received wavelength, and output to the one of uplink output channels 425.

Thus, in this embodiment, a part, such as half of the wavelengths are used for downlink, while the other part is used for uplink.

MRMs 308, 309 and MRRs 312, 310 may be connected to one or more MCUs 316, as described in association with FIG. 3 above.

Figure 5:
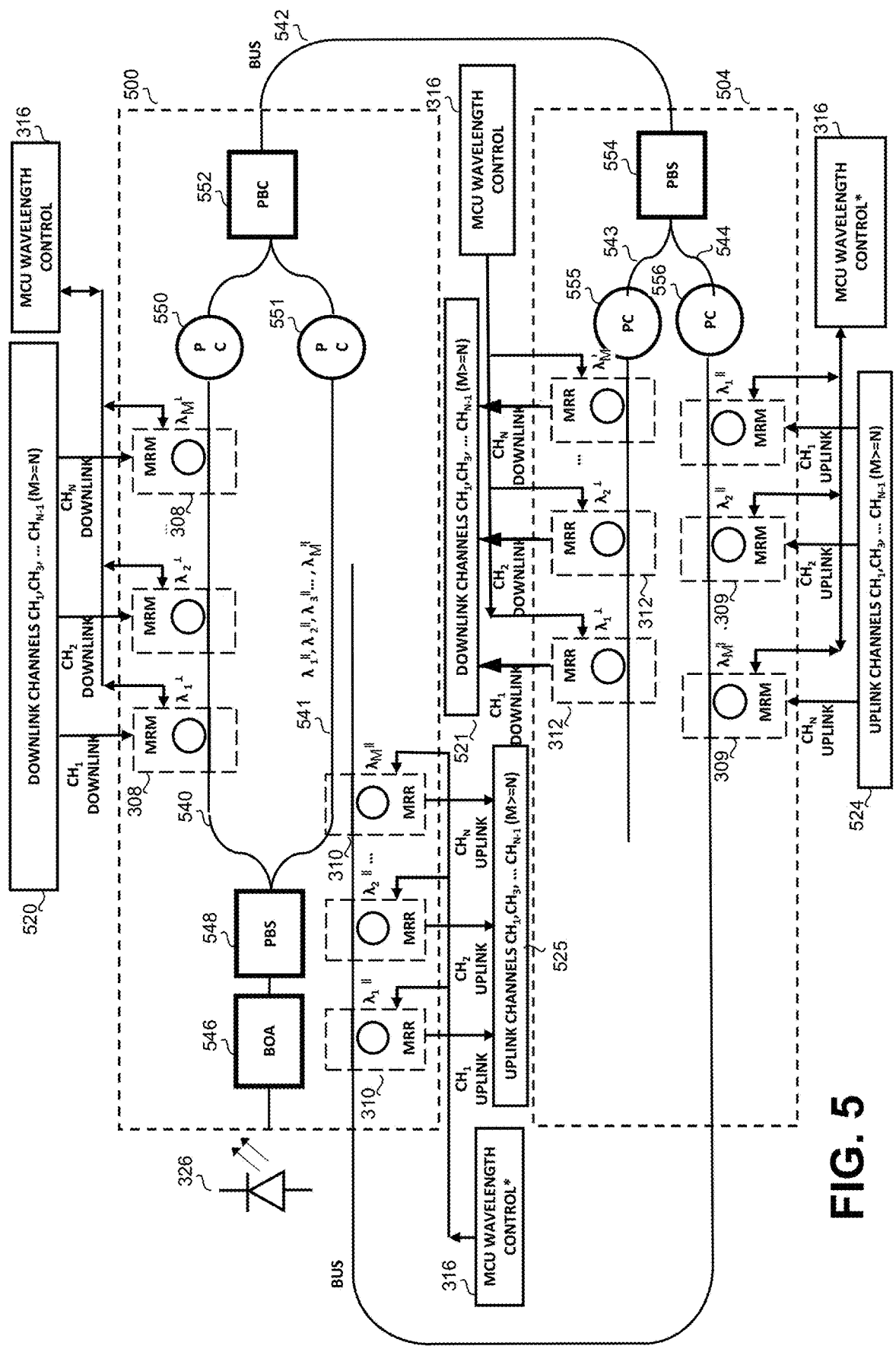
FIG. 5 shows a schematic diagram of yet another embodiment of inter-switch optical communication, in accordance with some exemplary embodiments of the disclosure.

Referring now to FIG. 5, showing a schematic diagram of yet another embodiment of inter-switch optical communication, in accordance with some exemplary embodiments of the disclosure.

FIG. 5 shows co-packaged optic system 500 (switch 1) and co-packaged optic system 504 (switch 2), which may be, for example, part of a data center. The terms so "uplink" and "downlink" are as described in association with FIG. 3 above.

Thus, for downlinks, switch 1 (500) is the transmitter and switch 2 (504) is the receiver, and vice versa for uplink.

Co-packaged optic system 1 500 (Switch 1) comprises a plurality of MRMs 308 and MRRs 310. Each MRM 308 is responsible for the transmission of one channel from downlink channels 520 and each MRR 310 is responsible for receiving one specific channel from uplink channels 525. Co-packaged optic system 504 (Switch 2) comprises a plurality of MRMs 309 and MRRs 312. Each MRM 309 is responsible for transmission of one channel from uplink channels 524 and each MRR 312 is responsible for receiving one specific channel from downlink channels 521.

Each of switch 1 (500) and switch 2 (504) supports a total of N downlink channels and N uplink channels.

The system comprises one or more comb lasers 326, irradiating light over M wavelengths, wherein M is equal to or larger than N. However, for simplicity it is assumed that N=M.

The light of comb laser 326 is amplified by Broadband Optical Amplifier (BOA) 546, which amplifies the laser output.

The amplified output from the laser goes through polarization beam splitter (PBS) 548, which splits the light in all wavelengths into two waveguides: waveguide 540 in which all wavelengths are polarized in a first polarity, and waveguide 541 in which all wavelengths are polarized in a second polarity.

Waveguide 540 carries the polarized light as modulated by MRMs 308 in accordance with downlink data as provided form downlink channels 520, and waveguide 541 carries the light in all wavelengths as polarized in the second polarization. The light carried by waveguide 540 after the modulation goes through polarization controller (PC) 550. PC 550 allows for correction or fine tuning of the polarization, due to slight polarization distortions that can be caused by the optical devices, and the light carried by waveguide 541 goes through PC 551. The light from waveguide 540 and waveguide 541 is combined by polarization beam combiner (PBC) 552, and is carried by waveguide 542.

Waveguide 542 enters PBS 554 which splits it into waveguide 543 that carries the wavelength in the first polarization, and waveguide 544 that carries the wavelength in the second polarization. Waveguides 543 and 544 enter PC 555 and 556, respectively, for the fine tuning of the polarization to the required polarization state. The light carried by waveguide 543 enters MRRs 312 of co-packaged optic system 504 (switch 2) and are output through downlink channels 521.

The light of the second polarization, carried by waveguide 544 enters MRMs 309 of Co-packaged optic system 504 (switch 2) which receive data through uplink channels 524, and then MRRs 310 of Co-packaged optic system 500 (switch 1), and are output through uplink channels 525 of Co-packaged optic system 500 (switch 1).

Thus, in this embodiment, each wavelength is used in one polarization for uplink, and in the other polarization for downlink. This arrangement provides for fully utilizing all channels, by receiving input in all downlink channels and providing output in all uplink channels, thereby doubling the spectral efficiency by transmitting a double amount of data without interference between channels. This is enabled due to the orthogonality of the data provided by the orthogonality of the polarization.

MRMs 308, 309 and MRRs 312, 310 may be connected to one or more MCUs 316, as described in association with FIG. 3 above.

Figure 6:
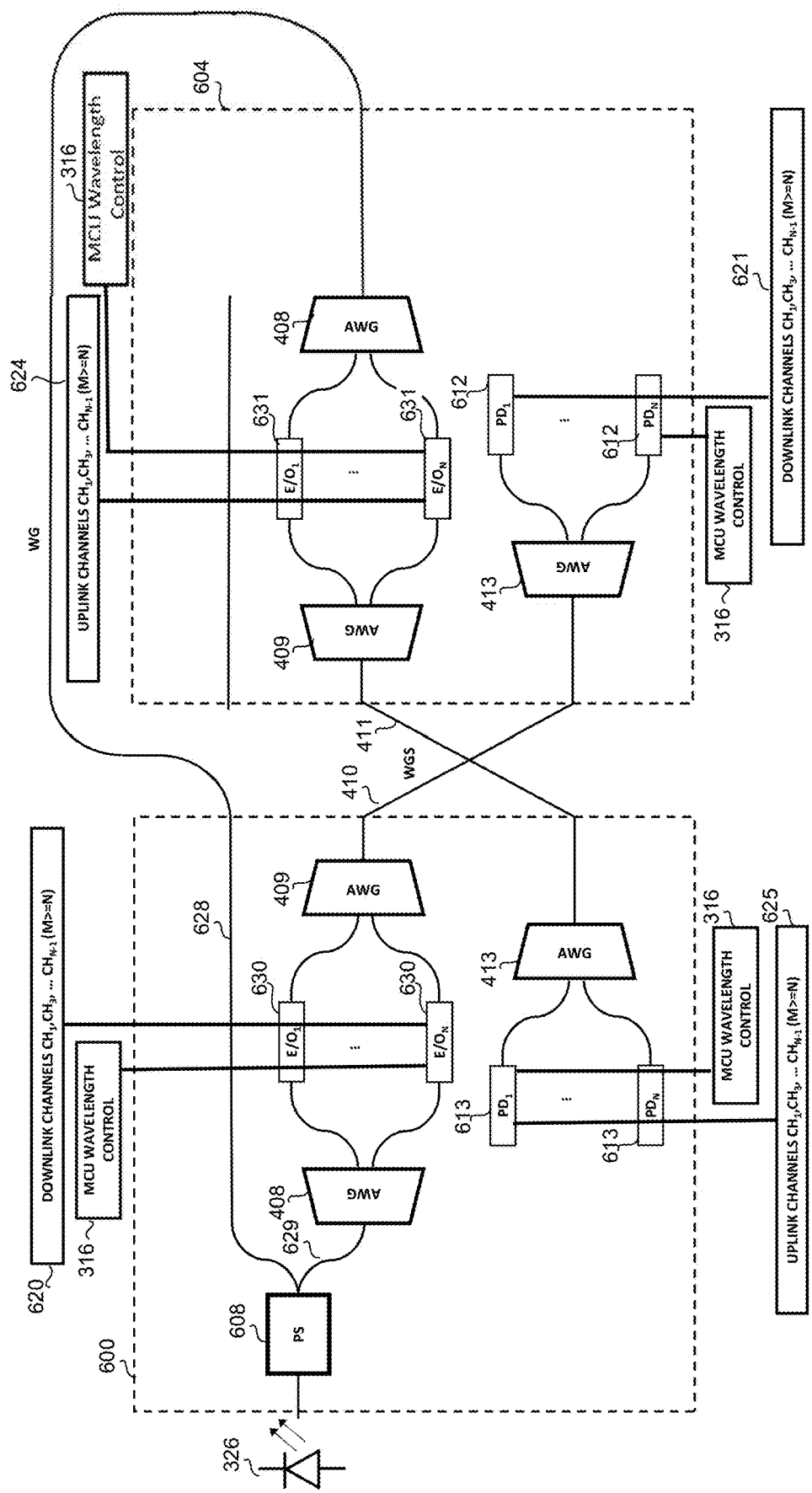
FIG. 6 shows a schematic diagram of yet another transmitter with all-optical multiplexing, in accordance with some exemplary embodiments of the disclosure.

Referring now to FIG. 6, showing a schematic diagram of yet another embodiment of inter-switch optical communication, in accordance with some exemplary embodiments of the disclosure.

FIG. 6 shows Co-packaged optic system 600 (switch 1) and Co-packaged optic system 604 (switch 2), which may be, for example, part of a data center. The terms "uplink" and "downlink" are as described in association with FIG. 3 above.

Thus, for downlinks, co-packaged optic system 600 (switch 1) is the transmitter and co-packaged optic system 604 (switch 2) is the receiver, and vice versa for uplink.

The light emitted by comb laser 326 may enter power splitter (PS) 608 of co-packaged optic system 600 (switch 1), which splits the power in each wavelength, such that each wavelength goes on waveguide 628 with a half of the power, and the same wavelength goes on waveguide 629 at half the power. It will be appreciated that in some embodiments the power splitting can be in a proportion other than 50-50, such 60-40, 70-30 or the like.

The light that goes on waveguide 629 enters AWG 408 where it is split to the N wavelengths. Each wavelength is modulated by the corresponding E/O 630 in accordance with the input received from the corresponding downlink channel from downlink channels 620. E/O 630 may be any electrical to optical converter. For example, MRM 308 may be one example to such converter. However, since AWG 408 splits the light to the various wavelengths, other modulators may be used, such as a Mach-Zehnder Modulator, Electro-Absorption Modulator, Plasmonic Modulator or the like.

The light in all wavelengths is combined by AWG 409, and transferred over waveguide 410 to AWG 413 of co-packaged optic system 604 (switch 2), where it is split again to the different wavelengths. Thus, there is no need for an MRR, since the wavelengths are already separated. The light in each wavelength enters a corresponding Photo Detector (PD) 612, and the data is output to the corresponding downlink channel from downlink channels 621.

The reverse path is exercised in the uplink direction, where the light carried by waveguide 628 is split by AWG 408 of co-packaged optic system 604 (switch 2) to the different wavelengths. Each wavelength is modulated by the relevant E/O 631 in accordance with the data received from a specific channel from uplink channels 624. The modulated light is combined by AWG 409 of co-packaged optic system 604 (switch 2), and goes over waveguide 411 to AWG 413 of co-packaged optic system 600 (switch 1).

In switch 1 (600) the light is split again by AWG 413, and the light in each wavelength enters a corresponding PD 613 without a need for a resonator, and output to the corresponding up channel from uplink channels 625.

Each of E/Os 630, 631 and PD 612, 613 may be connected to one or more MCUs 316, as described in association with FIG. 3 above.

As mentioned above, the disclosure is equally applicable to intra-switch communication, in order to save on the footprint, power and heat associated with metal wiring.

Figure 7:
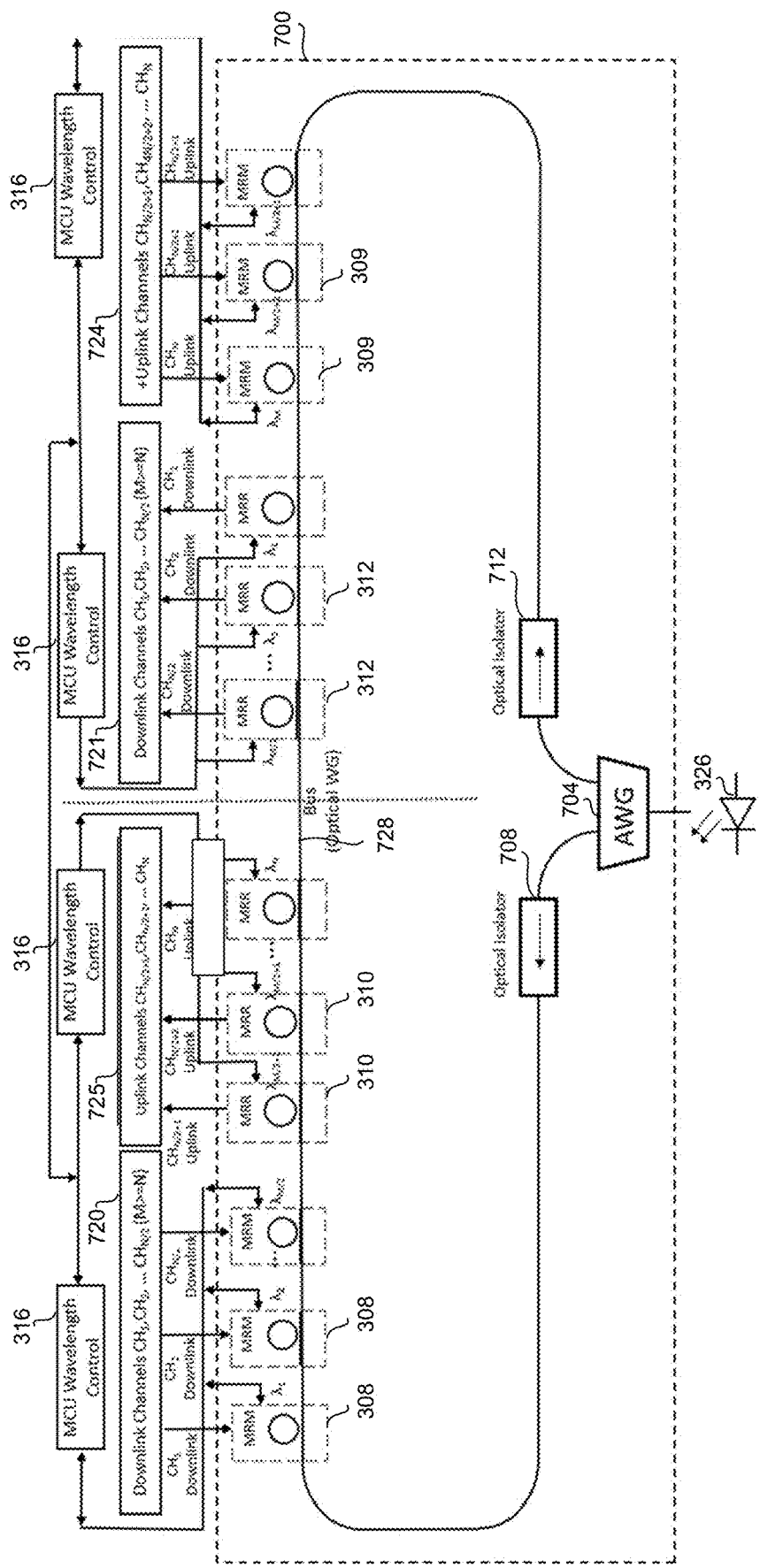
FIG. 7 shows a schematic illustration of an embodiment of intra-switch optical communication, in accordance with some exemplary embodiments of the disclosure.

Referring now to FIG. 7, showing a schematic illustration of an embodiment of intra-switch optical communication, in accordance with some exemplary embodiments of the disclosure.

Switch 700 receives light from external comb laser 326 irradiating light in M wavelengths, as described above. Switch 700 receives information from external devices via downlink channels 720 over half the wavelengths of comb laser 326, such as wavelengths $\lambda_1, \lambda_2 \ldots \lambda_{M/2}$ and transmits the information over outgoing downlink channels 721. The above is applicable to an even M, while if N is odd the middle wavelength can be used as a control channel. Similarly, switch 700 receives information from devices within its network via uplink channels 724 modulates wavelengths $\lambda_{M/2+1}, \lambda_{M/2+2} \ldots \lambda_M$, in accordance with the received information, and outputs the information over outgoing uplink channels 725. It will be appreciated that although the number of uplink and down channels is assumed to be equal for simplicity, this is not necessary, and other proportions may be used.

The light of comb laser 326 is split by AWG 704 into two collections of wavelengths. For example a first collection comprising wavelengths $\lambda_1, \lambda_2 \ldots \lambda_{M/2}$ is routed in one direction to optical isolator 708, and a second collection comprising wavelengths $\lambda_{M/2+1}, \lambda_{M/2+2} \ldots \lambda_M$ is routed in the other direction to optical isolator 712. Each of optical isolators 708 and 712 enables the light to pass in one direction and blocks the light from going in the reverse direction. One of the first group or the second group of wavelengths is used for downlink, and the other for uplink. AWG 704 may separate the wavelengths by applying a low band filter and a high band filter.

Thus, for example, the light in the first wavelength collection enters MRMs 308 which modulate it in accordance with the data from the corresponding downlink channel from downlink channels 720, and passed to MRRs 312, where it is detected and output through the corresponding downlink channel from downlink channels 721.

Analogously, the light in the second wavelength collection enters MRMs 309 which modulate it in accordance with the data from the corresponding uplink channel from uplink channels 724, and passed to MRRs 310, where it is detected and output through the corresponding uplink channel from uplink channels 725. This arrangement is advantageous in that comprises a common bus for the uplinks and downlinks, which reduces the number of optical connections.

MRMs 308, 309 and MRRs 312, 310 may be connected to one or more MCUs 316, as described in association with FIG. 3 above.

Figure 8:
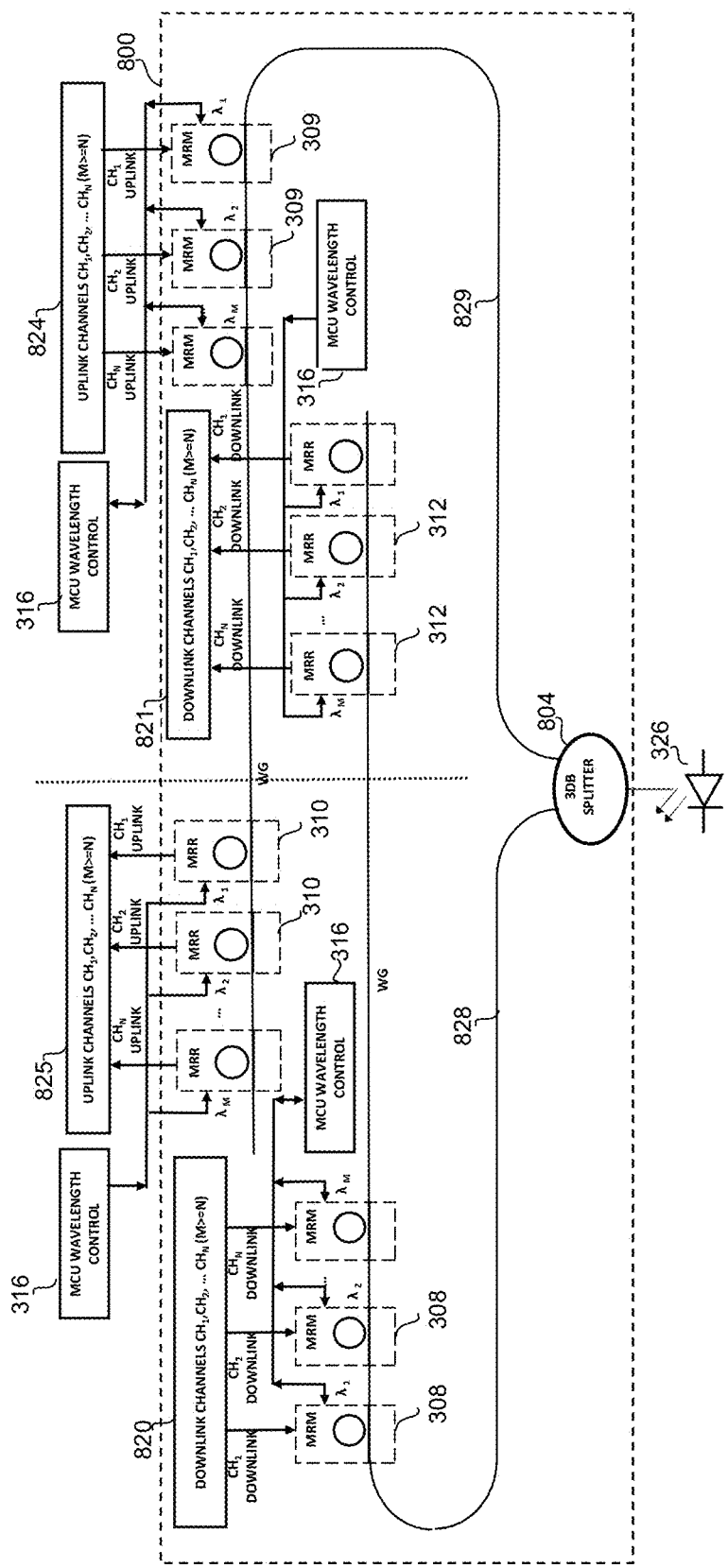
FIG. 8 shows a schematic illustration of another embodiment of intra-switch optical communication, in accordance with some exemplary embodiments of the disclosure.

Referring now to FIG. 8, showing a schematic diagram of another embodiment of intra co-packaged optics system (e.g., intra-switch) optical communication, in accordance with some exemplary embodiments of the disclosure.

Switch 800 receives light from external comb laser 326 irradiating light in M wavelengths, as described above. Switch 800 receives information from external devices via downlink channels 820 over N channels, wherein N may be equal to or small than M. For simplicity, it is assumed that N=M. The light in each wavelength is modulated by a corresponding MRM 308 in accordance with information received from a corresponding downlink channel from downlink channels 820. The modulated light is transmitted to the corresponding MRRs 312 which resonate, and provide the signals to corresponding downlink channels from downlink channels 821. Similarly, switch 800 receives information from devices within its network via uplink channels 824 on all wavelengths, modulates the light by corresponding MRMs 309, transmits the information to MRRs 310, and provide the output to the corresponding uplink channel from uplink channels 825.

The light of comb laser 326 is split, for example by 3 dB splitter 804, into two waveguides, waveguide 828 for the downlink, and waveguide 829 for the uplink, each receiving a part of the power. In some embodiments, the power may be split such that each waveguide receives half the power. In other embodiments, for example if higher load is expected in one of the uplink or downlink, then the power may be split accordingly, for example 40-60, 30-70 or the like.

Thus, both the downlink and the uplink communication use all wavelengths for enabling communication in all channels, but on separate busses. Providing two busses rather than one bus to the optical co-package does not require additional fibers, since it is intra-switch, thus this arrangement is advantageous in utilizing all channels.

MRMs 308, 309 and MRRs 312, 310 may be connected to one or more MCUs 316, as described in association with FIG. 3 above.

Figure 9:
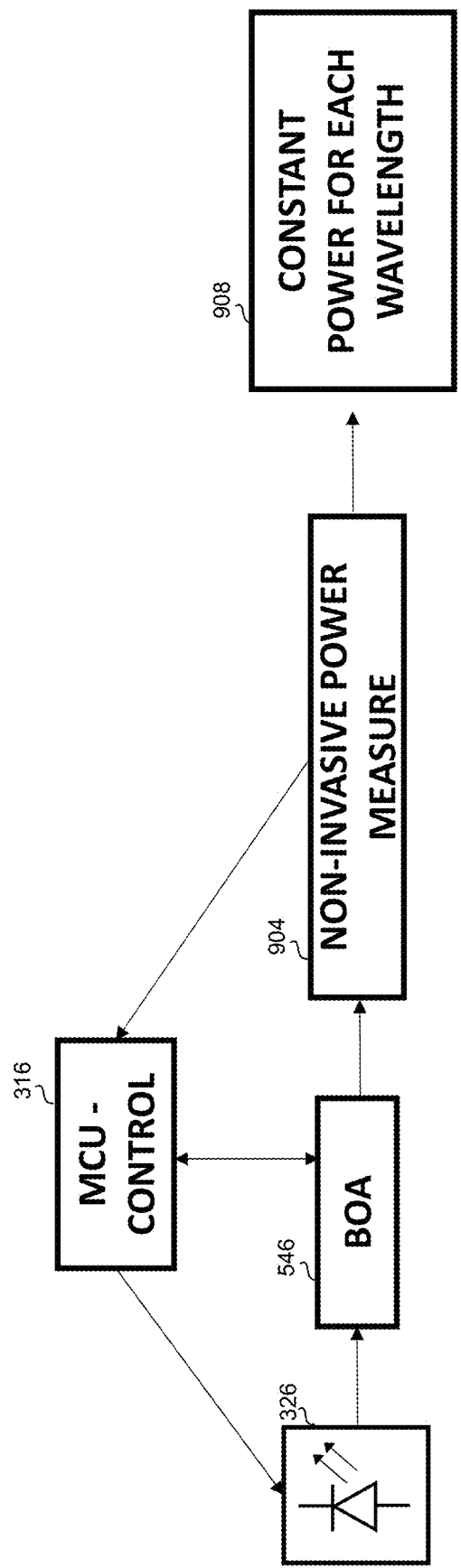
FIG. 9 is a schematic illustration of a device for controlling the output of a comb laser 326, in accordance with some exemplary embodiments of the disclosure.

Referring now to FIG. 9, showing a schematic illustration of a device for controlling the output of a comb laser, in accordance with some embodiments of the disclosure. Comb laser 326 outputs a plurality of wavelengths, for example 22 wavelengths. However, not all wavelengths are output with the same intensity, such that some may be of lower power than others. This may be problematic as different power levels of the wavelengths may lead to differences in the link performances of different channels. Thus, it is required to adjust the output of the comb laser, such that all wavelengths are output with the same power. This may be performed by launching the light at BOA 546 and amplifying it in all channels. When BOA 546 is saturated, all channels are equalized. The output light may be provided to non-invasive power measure 904, which measures the power at each of the wavelengths, and provides the measures to MCU 316.

Some embodiments of non-invasive power measure 904 are described, for example in U.S. patent application No. 63/146,659 filed Feb. 2, 2021 titled "Device and Method for Calibration, Monitoring and Control of the Integrated Photonic Systems", assigned to the same assignee as the current application, incorporated herein by reference in its entirety and for all purposes.

MCU 316 may then transmit a bias control signal to comb laser 326, to adjust the irradiation of all wavelengths, by controlling the bias current and operational temperature. The measurement, and if required also the feedback, may be performed every predetermined period of time, for example few milliseconds, half second, one second, ten seconds, thirty seconds, one minute, or the like.

Thus, comb laser 326 shown in the embodiments of any of FIGS. 3-8 above may be replaced by a device comprising comb laser 326. BOA 546 and non-invasive power measure 904, which device provides light in all wavelengths in the same intensity. MCU 316 may be the same MCU controlling MRMs 308, 309 and RRMs 310, 312. Alternatively, any two or more MCUs 316 may be used for controlling the comb laser(s), MRMs and RRMs. The device, as comb laser 326, may be external to the switch or to any other device handling communication between a network and devices external to the network.

It will be appreciated that comb laser 326 and BOA 546 can be separate devices or manufactured on the same substrate for integration efficiency.

Figure 10:
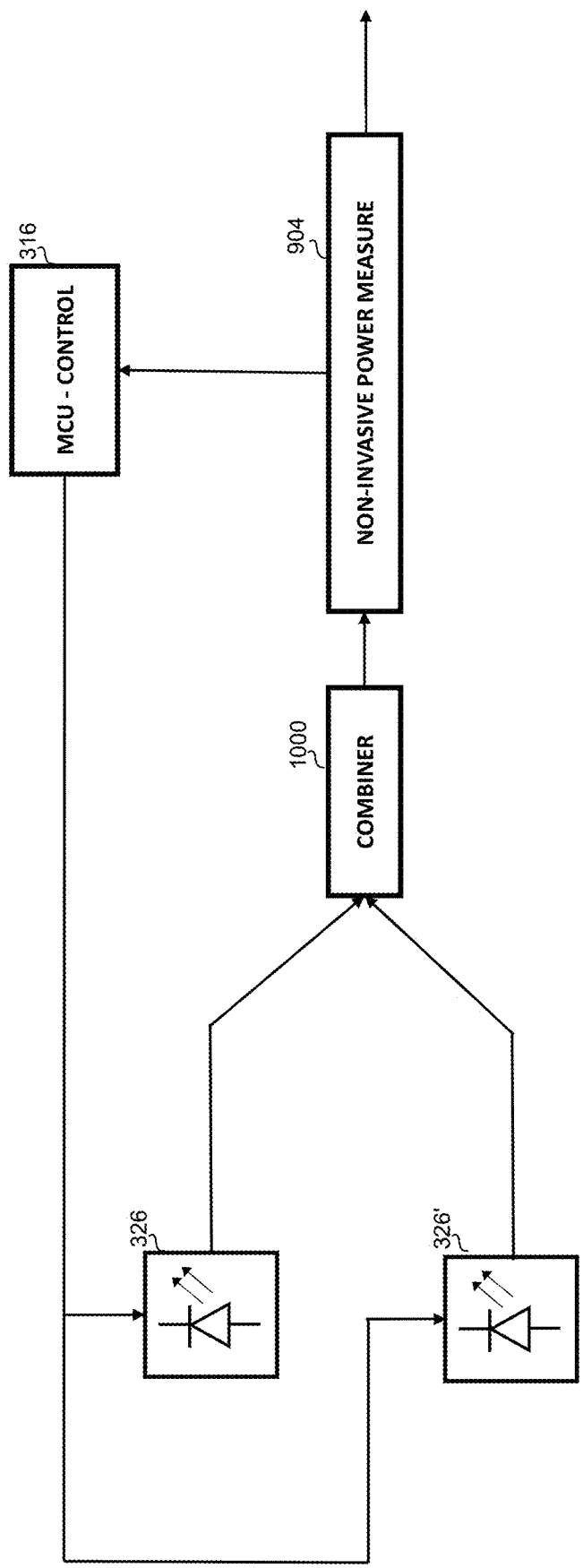
FIG. 10 is a schematic illustration of a device for ensuring uninterrupted operation of comb laser, in accordance with some exemplary embodiments of the disclosure.

Referring now to FIG. 10, showing a schematic illustration of a device for ensuring uninterrupted operation of comb laser 326, in accordance with some exemplary embodiments of the disclosure. As detailed above, a laser in general and a comb laser in particular are sensible devices with high failure rate. Therefore, in some embodiments, in order to ensure proper and continuous operation of a comb laser, redundancy may be used, and two or more comb laser devices, for example comb laser 326 and comb laser 326' may be used, wherein their output is combined by combiner 10M. The light output by power combiner 1000 may be measured by non-invasive power measure 904, which may transmit the measurements to MCU 316 for controlling comb laser 326 and comb laser 326'.

For example, if one of comb laser 326 and comb laser 326' operates properly, as can be determined by non-invasive power measure 904 reporting proper operation in all wavelengths when the other one is stopped, MCU 316 may keep the other comb laser in a non-active state. If the power of emitted light of the active laser drops in one or more wavelengths, MCU 316 may de-activate it and activate the other comb laser.

Thus, comb laser 326 shown in the embodiments of FIGS. 3-8 above may be replaced by a device comprising comb laser 326, comb laser 326', combiner 1000 and non-invasive power measure 904, which provides continuous and stable light in all wavelengths. MCU 316 may be the same MCU controlling MRMs 308, 309 and RRMs 310, 312. Alternatively, any two or more MCUs 316 may be used for controlling the comb laser 326 and comb laser 326', MRMs and RRMs. The device, as comb laser 326, may be external to the co-packaged optics system (e.g. a switch) or to any other device handling communication between a network and devices external to the network.

In some embodiments, the devices of FIG. 9 and FIG. 10 above may be combined, for example by using the device of FIG. 10 which is known to be operative in all so wavelengths, instead of comb laser 326 of FIG. 9, and enhancing its intensity in all wavelengths. Thus, a device comprised of components of the devices of FIG. 9 and FIG. 10 may be used instead of comb laser 326 shown in the embodiments of FIGS. 3-8 above. MCU 316 of FIG. 9, FIG. 10 and any of FIGS. 3-8 may be the same MCU controlling MRMs 308, 309 and RRMs 310, 312. Alternatively, any two or more MCUs 316 may be used for controlling the comb laser 326 and comb laser 326', MRMs and RRMs. The combined device, similarly to comb laser 326, may be external to the switch or to any other device handling communication between a network and devices external to the network.

Figure 11:
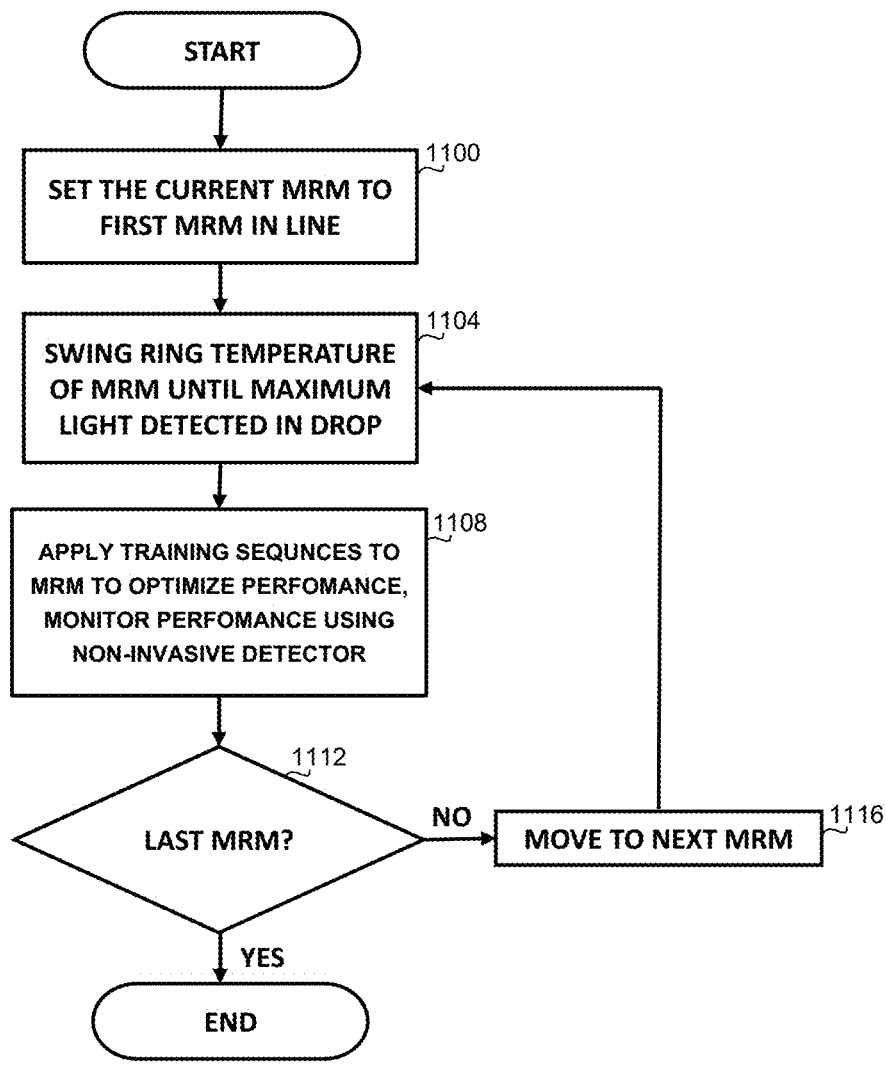
FIG. 11 is a flowchart of a method for adjusting MRMs to a required wavelength, in accordance with some embodiments of the disclosure.

Referring now to FIG. 11, showing a flowchart of a method for adjusting MRMs 308, 309 within a device, such as the devices of any of FIGS. 3-8 above, to a required wavelength, in accordance with some embodiments of the disclosure. The steps of FIG. 11 may be performed by one or more MCUs of a system in accordance with the disclosure.

On step 1100, the first MRM of the device may be selected for adjustment. The order of the MRMs may be random, predetermined, set by the wavelengths, by their physical location, or the like. In some embodiments, adjustment may start with the MRM closest to the light source, and proceed with further MRMs in increasing order of their distance from the light source.

On step 1104, the temperature and/or the bias voltage of the ring may be adjusted, for example by an MCU sending a control signal 216 to heater 212, while the light source provides light in the wavelength that is supposed to be locked by the MRM. The heat may change the electrical, optical and mechanical properties of the ring modulator, for example the dimensions of ring 204, and thereby the resonant wavelength to which it responds. The signal dropped into waveguide 210 may be measured, providing an indication of the intensity of the signal in the required wavelength. It will be appreciated that there may be some optical power at the vicinity of the resonance wavelength, wherein the power is maximal at the wavelength itself. When the drop signal reaches a maximum, the temperature and/or the bias voltage applied to the MRM may be stored, such that in the future the MCU may send control signals to bring the ring to this set of the operational parameters such as temperature and/or a bias voltage, thereby adjusting it to this wavelength.

On step 1108, various training sequences may be applied to the MRM in order to optimize the MRM performance in accordance with measures such as received optical power, extinction ratio, linearity, etc. The performance can be monitored by a non-invasive detector and/or the photo detector of the drop waveguide On step 1112, it may be determined whether the last MRM was handled. If not, the next MRM is selected on step 1116, and execution may return to step 1104 and then to step 1108, for adjusting the parameters of the next MRM.

Once all MRMs have been adjusted, the process may end.

Figure 12:
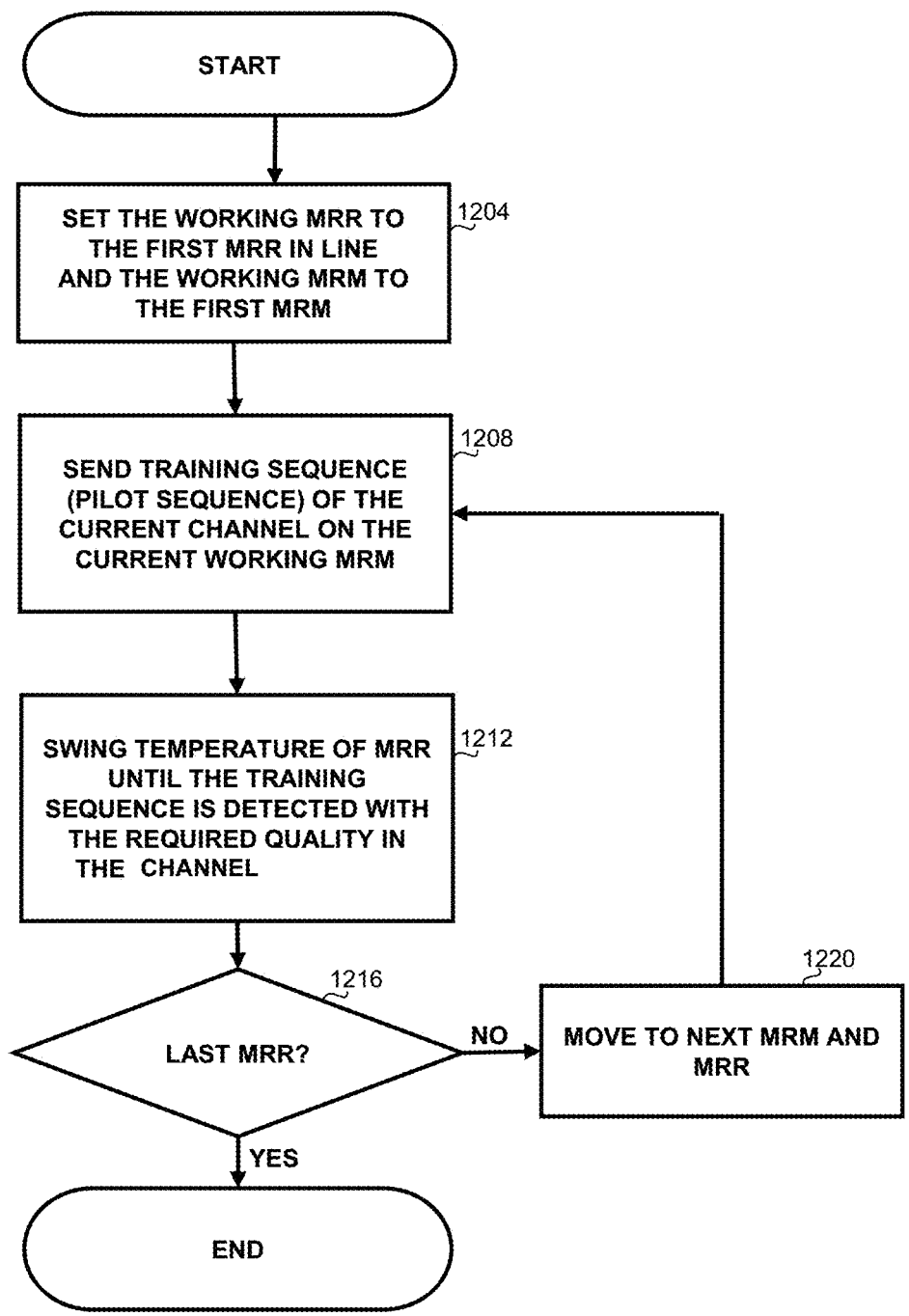
FIG. 12 is a flowchart of a method for adjusting MRRs to a required wavelength, in accordance with some embodiments of the disclosure.

Referring now to FIG. 12, showing a flowchart of a method for adjusting MRRs 310, 312 within a device, such as the devices of any of FIGS. 3-8 above, for a required wavelength, in accordance with some embodiments of the disclosure. The steps of FIG. 12 may be performed by one or more MCUs of a system in accordance with the disclosure.

The method of FIG. 12 may be performed after all MRMs have been adjusted to the associated wavelengths as detailed in association with FIG. 11 above.

On step 1204, the first pair of MRM and MRR is selected, for example the MRM closest to the light source and the corresponding MRR that is supposed to operate in the same wavelength.

On step 1208, a predetermined training sequence or pilot signal is applied to the current MRM and transmitted over a waveguide carrying light with the wavelength associated with the current MRM and MRR.

On step 1212 the temperature of the MRR is swung as described above in association with step 1104 for the MRM, until the training sequence or pilot signal is detected at the output of the MRR with the required quality in the output of a PD receiving the output of the MRR The quality can be measured in accordance with, but not limited to, any one or more of the following: channel performance, accumulated errors, Bit Error Rate (BER); Packet Error Rate; or Received Signal Strength Indicator (RSSI).

On step 1216, it may be determined whether the handled pair of MRM and MRR is the last pair. If not, the next MRM and MRR pair is selected on step 1120, and execution may return to step 1208 and then to step 1212, for adjusting the ring temperature of the MRR.

In some embodiments, N orthogonal training sequences may be transmitted simultaneously, for simultaneous adjustment of the MRRs. However, such simultaneous adjustment may be more costly in memory storage space, computational requirements and the calibration algorithm complexity.

Once an initial adjustment has been performed for the MRMs and MRR, re-adjustment may take place every predetermined period of time, for example every half second, one second, ten seconds, thirty seconds, one minute, or the like, after replacing one or more components, once an error indication is received, or the like, in order to correct misalignments between any of the MRMs or MRRs and the wavelength.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely so propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, such as "C", C#, C++, Java, Phyton, Smalltalk, or others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A communication system comprising:
a transmitter comprising a first optical module, the first optical module comprising a plurality of Micro-Ring Modulators (MRMs); and
a receiver comprising a second optical module, the second optical module comprising a plurality of Micro Ring

Resonators (MRRs), wherein the first optical module and the second optical module are connected by an optical waveguide; and at least one comb laser external to an optical co-package comprising the transmitter or the receiver, the at least one comb laser irradiating the optical waveguide, the at least one comb laser emitting light in a plurality of wavelengths, wherein at least one first MRM and at least one first MRR are adjusted to operate in at least one first wavelengths from the plurality of wavelengths, and at least one second MRM and at least one second MRR are adjusted to operate in at least one second wavelength from the plurality of wavelengths, wherein the at least one first MRM and at least one first MRR are adjusted to operate at the first wavelength using a first predetermined training sequence, and the at least one second MRM and at least one second MRR are adjusted to operate at the second wavelength using a second predetermined training sequence, wherein the first predetermined training sequence is different from the second predetermined training sequence, and wherein the first training sequence and the second training sequence are orthogonal to each other.

2. The communication system of claim 1, wherein the at least one first MRM and at least one first MRR are adjusted to operate using pilot signals.

3. The communication system of claim 1, wherein the transmitter and the receiver are comprised within one optical co-package.

4. The communication system of claim 1, wherein the transmitter is within a first optical co-package and the receiver is within a second optical co-package.

5. The communication system of claim 1, wherein downlink channels of the transmitter and receiver operate in a first plurality of wavelengths from the plurality of wavelengths, and uplink channels of the transmitter and receiver operate in a second plurality of wavelengths from the plurality of wavelengths, wherein the first plurality of wavelengths and the second plurality of wavelengths have no common wavelength.

6. The communication system of claim 5, wherein each wavelengths in the first plurality of wavelengths comprises frequencies is higher than at least one frequency of the second plurality of wavelengths.

7. The communication system of claim 1, wherein downlink channels of the transmitter and receiver operate in the plurality of wavelengths polarized to a first polarization, and uplink channels of the transmitter and receiver operate in the plurality of wavelengths polarized to a second polarization, wherein the first polarization is different form the second polarization.

8. The communication system of claim 1, further comprising a power splitter splitting power of the optical waveguide to a first part and a second part, wherein transmitting operates with the first part and receiving operates with the second part.

9. The communication system of claim 1, wherein the transmitter comprises a first optical waveguide micro controller unit (MCU) for controlling the plurality of MRMs, and the receiver comprises a second MCU for controlling the plurality of MRRs.

10. The communication system of claim 9, wherein the first MCU and the second MCU are adjusted using a handshake protocol.

11. The communication system of claim 1, further comprising a Broadband Optical Amplifier and a non-invasive power measure for ensuring equal power for each wavelength.

12. The communication system of claim 1, wherein the at least one comb laser comprises at least two comb lasers for providing redundancy, thereby reducing failure rate of the at least one comb laser.

13. The communication system of claim 1, wherein the MCU is configured to:

swing an MRM ring temperature of each MRM from the plurality of MRMs until maximum light is detected in a drop output; and change modulation of the MRM until a minimum is detected in non-invasive detector at an end of a line of the MRM.

14. The communication system of claim 13, wherein the MCU is further configured to:

for each MRR from the plurality of MRRs:
send a training sequence or pilot signals from an MRM corresponding to the MRR; and
swing an MRR ring temperature or the bias voltage of the MRR until the training sequence or the pilot signals are detected with a required quality in the channel.

15. The communication system of claim 14, wherein the MCU is further configured to repeat said: swing the MRM ring temperature or the bias voltage; changing modulation of the MRM; sending a training sequence or pilot signals; and swing an MRR ring temperature in accordance with a quality parameter.

16. The communication system of claim 14, wherein the quality parameter comprises at least one parameter selected from the group consisting of: channel performance, accumulated errors, Bit Error Rate (BER); Packet Error Rate; Received Signal Strength Indicator (RSSI).

17. The communication system of claim 1, wherein at least one MRM of the plurality MRMs is a segmented MRM (SMRM).

18. In a communication system comprising: a transmitter comprising a first optical module, the first optical module comprising a plurality of Micro-Ring Modulators (MRMs), a receiver comprising a second optical module, the second optical module comprising a plurality of Ring Resonator Modules (MRRs), wherein the first optical module and the second optical module are connected by an optical waveguide, and at least one comb laser external to an optical co-package comprising the transmitter or the receiver, the at least one comb laser irradiating the optical waveguide, the at least one comb laser emitting light in a plurality of wavelengths, wherein at least one first MRM and at least one first MRR are adjusted to operate in at least one first wavelengths from the plurality of wavelengths, and at least one second MRM and at least one second MRR are adjusted to operate in at least one second wavelength from the plurality of wavelengths, wherein the at least one first MRM and at least one first MRR are adjusted to operate at the first wavelength using a first predetermined training sequence, and the at least one second MRM and at least one second MRR are adjusted to operate at the second wavelength using a second predetermined training sequence, and wherein the first predetermined training sequence is different from the second predetermined training sequence, and wherein training sequences for different MRM-MRR pairs are orthogonal to each other, a method for adjusting the plurality of MRMs, the method comprising:

for each MRM from the plurality of MRMs:
- swinging an MRM ring temperature or the bias voltage of a first MRM from the plurality of MRMs until maximum light is detected in a drop output; and
- changing modulation of the MRM until a minimum is detected in non-invasive detector at an end of a line of the first MRM.

19. The method of claim 18, further comprising:

for a first MRR from the plurality of MRRs:
- sending a training sequence or pilot signals from the first MRM corresponding to the first MRR;
- swinging the first MRR ring temperature or the bias voltage of the first MRR until the training sequence or the pilot signals are detected with a required quality in a channel.

* * * * *